US012676926B2

(12) United States Patent
Settai

(10) Patent No.: US 12,676,926 B2
(45) Date of Patent: Jul. 7, 2026

(54) INFORMATION PROCESSING DEVICE, INFORMATION PROCESSING METHOD, AND PROGRAM

(71) Applicant: Sony Group Corporation, Tokyo (JP)

(72) Inventor: Daisuke Settai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 19/100,163

(22) PCT Filed: Jun. 21, 2023

(86) PCT No.: PCT/JP2023/022873
§ 371 (c)(1),
(2) Date: Jan. 31, 2025

(87) PCT Pub. No.: WO2024/034263
PCT Pub. Date: Feb. 15, 2024

(65) Prior Publication Data
US 2026/0052205 A1       Feb. 19, 2026

(30) Foreign Application Priority Data

Aug. 9, 2022     (JP) ................................. 2022-127023

(51) Int. Cl.
*G06F 3/0481*         (2022.01)
*G06F 9/451*          (2018.01)
(Continued)
(52) U.S. Cl.
CPC .............. *H04M 1/22* (2013.01); *G06F 9/451* (2018.02); *G09G 3/3406* (2013.01);
(Continued)
(58) Field of Classification Search
None
See application file for complete search history.

(56) References Cited

U.S. PATENT DOCUMENTS

2013/0311922 A1* 11/2013 Park ...................... H04M 1/656
715/764
2014/0333831 A1* 11/2014 Oh ......................... H04M 1/185
348/376
(Continued)

FOREIGN PATENT DOCUMENTS

EP           2937762 A1    10/2015
JP         2006-141027 A     6/2006
(Continued)

OTHER PUBLICATIONS

International Search Report and Written Opinion mailed on Sep. 5, 2023, received for International Application No. PCT/JP2023/022873, filed on Jun. 21, 2023, 10 pages including English Translation.
5-Minutes Tech: "How to change auto lock time in Samsung Galaxy A13",, Jul. 1, 2022 (Jul. 1, 2022), XP093273725, Retrieved from the Internet: URL:https://www.youtube.com/watch?v=3BvsleR5bZU.

*Primary Examiner* — Carl Adams
(74) *Attorney, Agent, or Firm* — XSENSUS LLP

(57)                ABSTRACT

An app is configured to continuously execute even while a display unit display is stopped in an information processing device. A control unit executes app execution control, and display control of the display unit determines whether an app being executed in normal operation mode is a fake sleep mode applicable app or a fake sleep mode non-applicable app. In the case of the fake sleep mode applicable app, transition is made to a fake sleep mode in which display of an app execution screen is stopped or changed to power-saving display in response to a defined mode transition condition, and the app is continuously executed. In the case of the fake sleep mode non-applicable app, transition is made to a sleep mode in which the display of the app execution screen is stopped and the execution of the app is also stopped in response to a mode transition condition.

20 Claims, 27 Drawing Sheets

(51) Int. Cl.

| | | |
|---|---|---|
| *G09G 3/34* | (2006.01) | |
| *H04M 1/22* | (2006.01) | |
| *H04M 1/72427* | (2021.01) | |
| *H04M 1/72454* | (2021.01) | |
| *H04M 1/72463* | (2021.01) | |
| *G06F 1/3246* | (2019.01) | |

(52) U.S. Cl.
CPC ... *H04M 1/72427* (2021.01); *H04M 1/72454* (2021.01); *H04M 1/724634* (2022.02); *G06F 1/3246* (2013.01); *G09G 2320/0606* (2013.01); *G09G 2330/022* (2013.01); *G09G 2330/023* (2013.01); *G09G 2340/0435* (2013.01); *G09G 2354/00* (2013.01); *H04M 2201/38* (2013.01); *H04M 2250/10* (2013.01)

(56) References Cited

U.S. PATENT DOCUMENTS

| 2017/0023998 A1 | 1/2017 | Yang | |
| 2017/0052560 A1 | 2/2017 | Yang | |
| 2017/0249007 A1* | 8/2017 | Hardin .................. | G06F 1/3206 |

FOREIGN PATENT DOCUMENTS

| JP | 2007-221829 A | 8/2007 |
|---|---|---|
| JP | 2011-087058 A | 4/2011 |
| JP | 2011-221672 A | 11/2011 |
| JP | 2011-233979 A | 11/2011 |
| JP | 2019-062464 A | 4/2019 |

* cited by examiner

11 FAKE SLEEP MODE APPLICABLE
APP IDENTIFIER ICON

12 POWER BUTTON

10 SMARTPHONE (INFORMATION PROCESSING DEVICE)

STAGE 1

Fig. 5

| MODE | | (a) DISPLAY UNIT | (b) CALL AND MESSAGE RECEPTION | (c) FAKE SLEEP MODE APPLICABLE APP | (d) FAKE SLEEP MODE NON-APPLICABLE APP | (e) LOCK STATE |
|---|---|---|---|---|---|---|
| (1) | NORMAL OPERATION MODE | DISPLAY PROCESSING EXECUTION | POSSIBLE | CONTINUOUS EXECUTION OF APP | CONTINUOUS EXECUTION OF APP | UNLOCKED STATE |
| (2) | FAKE SLEEP MODE | DISPLAY STOP (TURN-OFF) | POSSIBLE | CONTINUOUS EXECUTION OF APP | (MODE TRANSITION IS DISABLED) | UNLOCKED STATE |
| (3) | SLEEP MODE | DISPLAY STOP (TURN-OFF) | POSSIBLE | STOP OF APP | STOP OF APP | LOCKED STATE |
| (4) | POWER-OFF MODE | DISPLAY STOP (TURN-OFF) | IMPOSSIBLE | STOP OF APP | STOP OF APP | LOCKED STATE |

10 SMARTPHONE
(INFORMATION
PROCESSING DEVICE)

Fig. 23

| | CONDITION FOR TRANSITION FROM NORMAL OPERATION MODE TO "FAKE SLEEP MODE" | DETECTION APPLICATION INFORMATION |
|---|---|---|
| (1) | SHORT PRESS OF POWER BUTTON | POWER BUTTON OPERATION INFORMATION |
| (2) | PROXIMITY OF DISPLAY UNIT OF SMARTPHONE TO OBJECT | PROXIMITY SENSOR DETECTION VALUE |
| (3) | DECREASE IN ILLUMINANCE IN VICINITY OF DISPLAY UNIT OF SMARTPHONE (COMPLETE DARKNESS) | ILLUMINANCE SENSOR DETECTION VALUE |
| (4) | DETECTION OF VEHICLE MOVEMENT BY SMARTPHONE | GPS SIGNAL |

Fig. 25

| | CONDITION FOR TRANSITION FROM "FAKE SLEEP MODE" TO "NORMAL OPERATION MODE" | DETECTION APPLICATION INFORMATION | POWER BUTTON OPERATION INFORMATION | PROXIMITY SENSOR DETECTION VALUE | ILLUMINANCE SENSOR DETECTION VALUE | GPS SIGNAL | DISPLAY UNIT SENSOR (TOUCH PANEL SENSOR) |
|---|---|---|---|---|---|---|---|
| (1) | SHORT PRESS OF POWER BUTTON | | | | | | |
| (2) | SEPARATION OF DISPLAY UNIT OF SMARTPHONE FROM PROXIMATE OBJECT | | | | | | |
| (3) | INCREASE IN ILLUMINANCE IN VICINITY OF DISPLAY UNIT OF SMARTPHONE (COMPLETE DARKNESS IS SOLVED) | | | | | | |
| (4) | STATE WHERE VEHICLE MOVEMENT BY SMARTPHONE IS DETECTED IS SOLVED | | | | | | |
| (5) | DISPLAY UNIT IS TOUCHED | | | | | | |

INFORMATION PROCESSING DEVICE, INFORMATION PROCESSING METHOD, AND PROGRAM

CROSS-REFERENCE TO RELATED APPLICATIONS

This application is a national stage application, pursuant to 35 U.S.C. § 371, of International Patent Application No. PCT/JP2023/022873, filed Jun. 21, 2023, which claims priority to Japanese Patent Application No. 2022-127023, filed Aug. 9, 2022, the entire contents of each are incorporated herein by reference.

TECHNICAL FIELD

The present disclosure relates to an information processing device, an information processing method, and a program, and more particularly to an information processing device, an information processing method, and a program that achieve power saving and improvement in operability in a case where an app (application) such as a game app is executed using a smartphone (smart phone).

BACKGROUND ART

In recent years, many users enjoy various apps (applications), for example, game apps, using information processing devices such as and smartphones (smart phones).

In a case where a game app is executed on a smartphone, an execution screen of the game app is displayed on a display unit of the smartphone, and a user performs various operations to advance the game.

There are many types of game apps that can be executed on smartphones, and among these game apps, for example, there is a game app (idle game app) in which, once a predetermined initial setting is performed, a game progresses thereafter for a certain period of time without any user operation.

Specifically, for example, there is a game app including a plurality of stages from stage 1 to stage n. In the game app, it is possible to proceed to the next stage by sequentially clearing each stage from stage 1, and a difficulty level gradually increases as the stage proceeds. In such a game app, there is a case where the first half of the stages can be cleared only by the initial setting.

In a case where a user uses a smartphone to execute the game app that allows such idle play, the user performs a predetermined initial setting, and thereafter, only views a game displayed on the smartphone.

For example, among users who play the same game a plurality of times, there are some users who do not want to carefully view game execution screens for the first half of the stages, and there are many users who want to enjoy the play only for the second half of the stages.

In such a game app, if a game screen of an initial stage that is not intensively viewed is displayed on the smartphone, a battery of the smartphone is consumed, which is not preferable.

If possible, it is desirable to stop the display of the display unit of the smartphone to reduce the battery consumption during an execution period of the game screen of the initial stage.

However, in a general smartphone, there is a problem that an app being executed is also stopped when display of a display unit is stopped.

In a PC, processing of stopping only display of a display unit while executing a game app is possible, but such processing is difficult in many smartphones.

A smartphone is powered OFF by, for example, a long press of a power button. In addition, a transition to a sleep state can be made by a short press of the power button. Note that the "long press" is button press processing of continuing a button pressed state for several seconds, and the "short press" is button press processing of making the duration of the button pressed state shorter than that of the "long press".

In the smartphone, it is possible to stop display of a display unit by setting the power-OFF state or the sleep state.

Note that call and message reception is stopped in the power-OFF state, whereas call and message reception can be performed in the sleep state.

However, in both the power-OFF state and the sleep state of the smartphone, not only the display unit is turned off, but also a game app being executed on the smartphone is stopped.

Therefore, for example, in a case where a user sets the smartphone to the sleep state and then short presses the power button again to transition from the sleep state to a normal operation state, a game screen at a time point of being stopped when the transition to the sleep is displayed again on the display unit, and the user resumes a game from the re-displayed game screen at the time of the transition to the sleep.

Specific apps, such as a message reception app and a position detection app, are set to be continuously executed even when the display of the display unit is stopped, but other general game apps and the like are set such that the apps are stopped when the display of the display unit is stopped. That is, progress of a game stops in a game app that is being executed.

In this manner, for most apps such as game apps in smartphones, it is necessary to maintain the display unit in a display state in order to continue execution states of the apps, and as a result, unnecessary battery consumption occurs.

Note that, for example, PTL 1 (JP 2011-221672A) is a conventional art that discloses a configuration for achieving power saving of an information processing device.

PTL 1 discloses a configuration that causes a home appliance such as a television to execute a predetermined operation in accordance with a motion (gesture) of a hand, for example.

PTL 1 discloses a configuration in which a skin area such as a human hand is detected from an image captured by a camera to analyze the motion of the hand. Since power consumption increases when analysis processing of the motion of the hand is continuously executed, intermittent processing of the transition to an active mode in which processing of detecting the motion of the hand is executed only when a state in which there is no motion of the hand motion has been continuously detected for a predetermined time, thereby achieving power saving.

However, the configuration illustrated in this conventional art is a configuration corresponding to specific processing of detecting the motion of the hand of a user, and it is difficult to apply the configuration to various apps executed in smartphones.

CITATION LIST

Patent Literature

[PTL 1]
  JP 2011-221672A

SUMMARY

Technical Problem

With the foregoing problems in view, it is an object of the present invention to provide an information processing device, an information processing method, and a program that achieve power saving during execution of an app such as a game app is executed using a smartphone by stopping, that is, turning off display of a display unit while continuing the app being executed, and further improve operability of a user.

Solution to Problem

A first aspect of the present disclosure is an information processing device including
  a control unit that executes app execution control and display control of a display unit,
  the control unit
  determining whether an app being executed in a normal operation mode is a fake sleep mode applicable app or a fake sleep mode non-applicable app,
  executing mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and
  executing mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.
Further, a second aspect of the present disclosure is
an information processing method executed in an information processing device,
  the information processing device including a control unit that executes app execution control and display control of a display unit,
  the control unit
  determining whether an app being executed in a normal operation mode is a fake sleep mode applicable app or a fake sleep mode non-applicable app,
  executing mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and
  executing mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.
Further, a third aspect of the present disclosure is
A program for causing an information processing device to execute information processing,
  the information processing device including a control unit that executes app execution control and display control of a display unit,
  the program causing the control unit to
  determine whether an app being executed in a normal operation mode is a fake sleep mode applicable app or a fake sleep mode non-applicable app,
  execute mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and
  execute mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.

Note that the program of the present disclosure is, for example, a program that can be provided to an information processing device or a computer system capable of executing various program codes, in a computer-readable format by a storage medium or communication medium. When such a program is provided in a computer-readable format, processing according to the program is implemented on the information processing device or the computer system.

Still other objects, features and advantages of the present disclosure will become apparent by more detailed description based on embodiments of the present disclosure and the accompanying drawings described below. In the present specification, the system is a logical collective configuration of a plurality of devices, and the devices of the respective configuration are not limited to being in the same housing.

According to a configuration of one embodiment of the present disclosure, according to a configuration of one embodiment of the present disclosure, a configuration in which an app can be continuously executed even while display of a display unit is stopped is achieved in an information processing device such as a smartphone.

Specifically, for example, a control unit that executes app execution control and display control of the display unit is provided. The control unit determines whether an app being executed in a normal operation mode is a fake sleep mode applicable app or a fake sleep mode non applicable app, executes mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and executes mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.

These steps of processing achieve the configuration in which the app can be continuously executed even while the display of the display unit is stopped in the information processing device such as a smartphone.

Note that the effects described in the present specification are merely examples and not limited, and there may be additional effects.

BRIEF DESCRIPTION OF DRAWINGS

FIG. 5 is a diagram for describing a plurality of modes set in the information processing device of the present disclosure.

FIG. 23 is a diagram for describing examples of a condition for a transition from a "normal movable mode" to the "fake sleep mode".

FIG. 25 is a diagram for describing examples of a condition for a transition from the "fake sleep mode" to the "normal movable mode".

DESCRIPTION OF EMBODIMENTS

Figure 1:
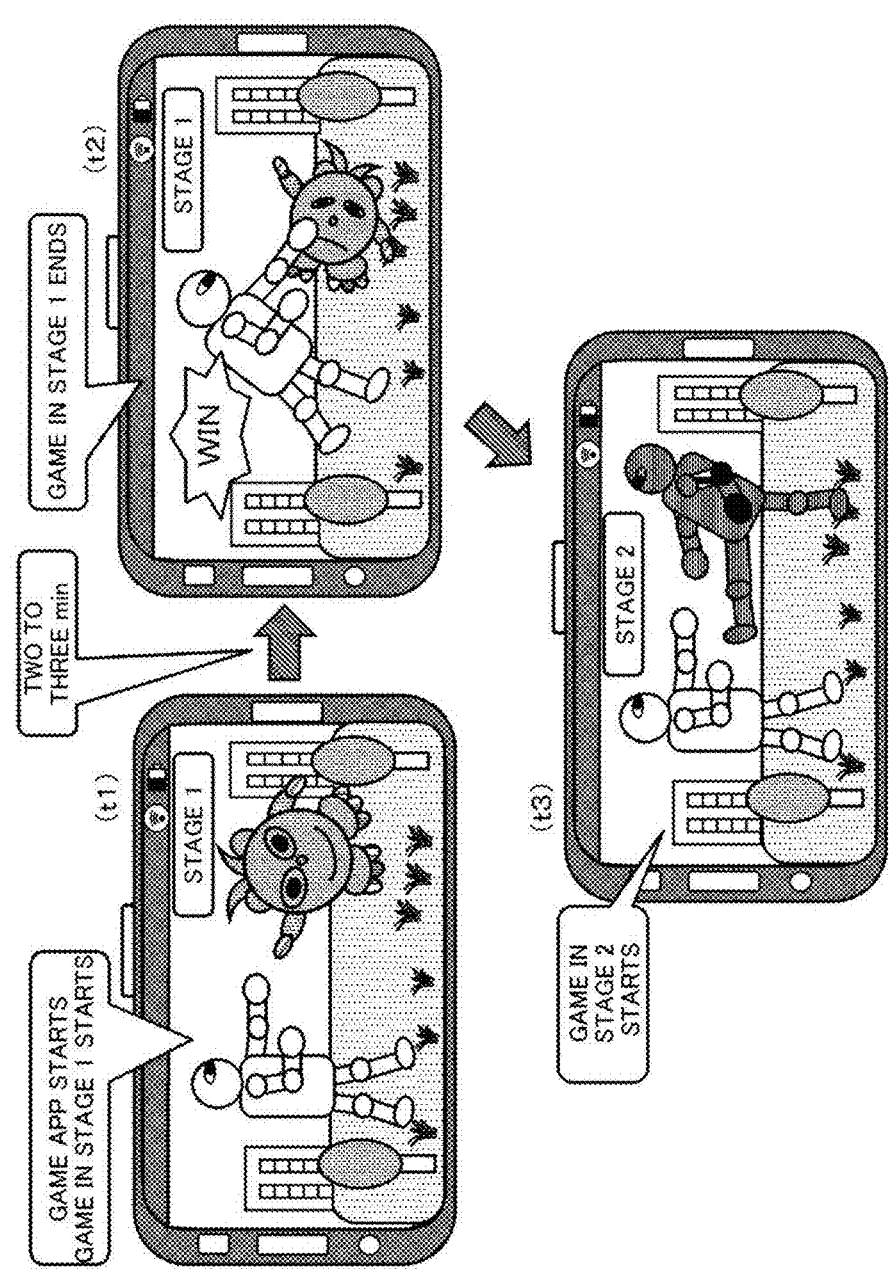
FIG. 1 is a diagram for describing examples of state transitions in a case where an execution screen of a game app is displayed on a display unit of a smartphone and a game is advanced.

Hereinafter, details of an information processing device, an information processing method, and a program of the present disclosure will be described with reference to the drawings. Note that the description will be given in the following order.

1. Overview of processing executed by information processing device of present disclosure
2. Details of setting mode and mode transition in information processing device of present disclosure
3. Processing of setting "fake sleep mode applicable app" and configuration example of user interface (UI) used for setting processing
4. Sequence of processing executed by information processing device of present disclosure
5. Configuration example of information processing device of present disclosure
6. Hardware configuration example of information processing device of present disclosure
7. Summary of configuration of present disclosure.

1. Overview of Processing Executed by
Information Processing Device of Present
Disclosure First, "1. Overview of processing executed by information processing device of present disclosure" will be described.

Specifically, an information processing device of the present disclosure is, for example, a smartphone (smart phone).

A user can execute various apps (applications), for example, a game app, using the smartphone.

In a case where a game app is executed on the smartphone, an execution screen of the game app is displayed on a display unit of the smartphone, and the user performs various operations to advance the game.

However, among the game apps executable by the smartphone, for example, there is a game app (idle game app) in which, once a predetermined initial setting is performed, a game progresses thereafter for a certain period of time without any user operation as described above.

A specific example will be described with reference to FIG. 1.

FIG. 1 illustrates examples of state transitions (times (t1) to (t2) to (t3)) in a case where an execution screen of a game app is displayed on a display unit of a smartphone 10 such that a game progresses.

The game app being executed on the smartphone illustrated in FIG. 1 is a game app including a plurality of stages from stage 1 to stage n. It is possible to proceed to the next stage by sequentially clearing each stage from stage 1, and a difficulty level gradually increases as the stage proceeds.

Display data on the display unit of the smartphone at time (t1) in FIG. 1 corresponds to a game start screen of "stage 1" which is the first stage of the game app.

Display data at the next time (t2) corresponds to a game end screen of "stage 1". Note that this game is a battle game, and a robot on the left has a battle (fight) with a character on the right in accordance with a user operation. The robot proceeds to the next stage by winning against the character, and has a battle with another character in the next stage.

The display data at time (t2) illustrated in FIG. 1 is the game end screen of "stage 1" and indicates a state in which the robot on the user side wins against the character that is an enemy.

A time from the start of "stage 1" at time (t1) to the end of "stage 1" at time (t2) illustrated in FIG. 1 is, for example, 2 to 3 min.

In this manner, it is possible to proceed to the next "stage 2" by winning at the battle in "stage 1".

Display data at time (t3) illustrated in FIG. 1 corresponds to a game start screen of "stage 2". In "stage 2", a battle with a character different from "stage 1" is carried out.

In such a game app, for example, it is assumed that "stage 1" which is the first stage is a setting that can be cleared (won) only by the initial setting.

In other words, in a case where the user plays "stage 1" using the smartphone, the user performs a predetermined initial setting, and thereafter, simply views the game displayed on the smartphone.

For example, among users playing the same game a plurality of times, there are many users who have needs for proceeding to the next stage without viewing such a game screen.

In such a case, even if the game screen for 2 to 3 min. from the start to the end of the game in stage 1 is displayed on the smartphone, only a battery of the smartphone is consumed, and it is desirable to stop the display of the display unit in order to prevent the battery consumption.

As described above, a general smartphone is powered OFF when a power button, for example, is long pressed, and can be made to transition to a sleep state when the power button is short pressed. The display of the display unit can be stopped by setting a power-OFF state or the sleep state.

However, in the power-OFF state or the sleep state of the general smartphone, not only the display unit is turned off, but also the game app being executed on the smartphone is stopped.

Therefore, even if the user short-presses the power button again to make a transition from the sleep state to a normal operation state after the sleep state is set, the game app before the transition to the sleep state is stopped in a game state before the transition to the sleep state, and thus, needs to resume the game from the game state before the transition to the sleep state again to execute the same game.

The information processing device (smartphone) of the present disclosure solves such a problem.

That is, the information processing device (smartphone) of the present disclosure has a configuration capable of continuously executing an app being executed even in a case where the display of the display unit is stopped while the app such as a game app is being executed on the smartphone.

Since such processing is possible, it is possible to reduce unnecessary power consumption of the smartphone and to efficiently advance an app such as a game without performing troublesome processing such reactivation of the game.

Note that, in the present specification, a mode in which the display of the display unit is stopped while the app is being executed on the smartphone and the app is continuously executed is referred to as a "fake sleep mode".

A conventional "sleep mode" is a mode in which the app is also stopped when the display of the display unit is stopped while the app is being executed on the smartphone.

In this manner, in the present specification, the mode in which the app is continuously executed while the display of the display unit is stopped is referred to as the "fake sleep mode", and the mode in which the app is also stopped along with the stop of the display of the display unit is referred to as the "sleep mode", and these two modes are distinguished and described.

An overview of processing executed by the smartphone, which is an example of the information processing device of the present disclosure, will be described with reference to FIGS. 2 to 4.

Figure 2:
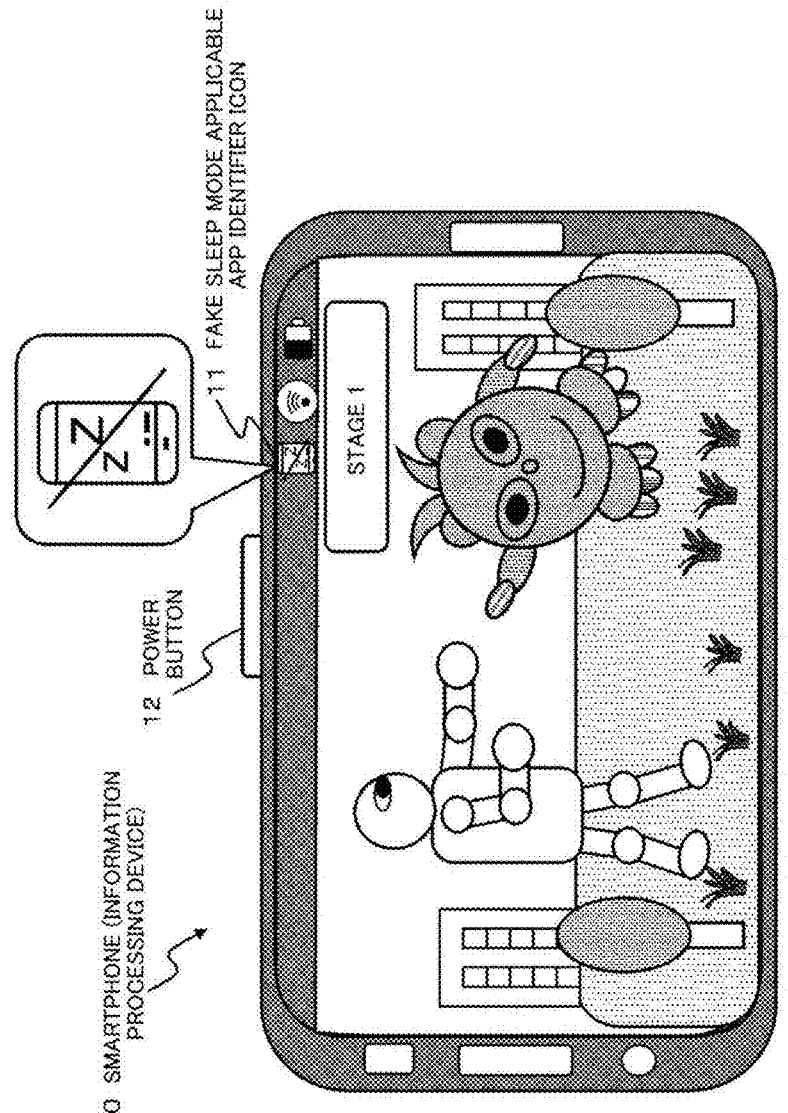
FIG. 2 is a diagram for describing an overview of processing executed by a smartphone which is an example of an information processing device of the present disclosure.

FIG. 2 is a diagram illustrating an example of a state in which a game app is being executed in the smartphone (information processing device) 10 of the present disclosure.

The game app being executed by the smartphone 10 is a game app similar to that described above with reference to FIG. 1, and is a game app including a plurality of stages from stage 1 to stage n. It is possible to proceed to the next stage by sequentially clearing each stage from stage 1, and a difficulty level gradually increases as the stage proceeds.

As illustrated in FIG. 2, a plurality of icons are displayed in a status bar in the upper part of a game screen displayed on the display unit of the smartphone 10. For example, there are an icon indicating a remaining battery capacity or an icon indicating a WiFi connection status. In addition to these icons, a "fake sleep mode applicable app identifier icon 11" is displayed on the status bar in the smartphone of the present disclosure as illustrated in FIG. 2.

The "fake sleep mode applicable app identifier icon 11" is an icon indicating that the app currently being executed in the smartphone 10, that is, the game app displayed on the display unit is a "fake sleep mode applicable app".

For example, the "fake sleep mode applicable app" is an app set to transition to the "fake sleep mode" instead of the "sleep mode" when a power button 12 is short pressed while the app is being executed.

In the "fake sleep mode", the display of the display unit of the smartphone 10 is stopped (turned off), but the app being executed is continuously executed.

In the smartphone 10 of the present disclosure, either the "fake sleep mode applicable app" or a "fake sleep mode non-applicable app" can be set on an app-by-app basis.

In the smartphone 10, when the "fake sleep mode applicable app" is executed, the "fake sleep mode applicable app identifier icon 11" is displayed on the display unit.

Since the "fake sleep mode applicable app identifier icon 11" is displayed on the display unit of the smartphone 10 illustrated in FIG. 2, the app being executed, that is, the game app whose game screen is displayed on the display unit is the "fake sleep mode applicable app".

Note that an app that is not the "fake sleep mode applicable app", that is, the "fake sleep mode non-applicable app" transitions to not the "fake sleep mode" but the "sleep mode" similar to the conventional one when the power button 12 is short pressed while the app is being executed.

In the "sleep mode", the display of the display unit of the smartphone 10 is stopped (turned off), and the app being executed is also stopped.

The app being executed by the smartphone 10 illustrated in FIG. 2, that is, the game app in which the game screen is displayed on the display unit is the "fake sleep mode applicable app".

An example of an execution sequence of the "fake sleep mode applicable app" will be described with reference to FIGS. 3 and 4.

As described above, the app being executed by the smartphone 10, that is, the game app in which the game screen is displayed on the display unit is a game app similar to that described above with reference to FIG. 1, and is a game app including a plurality of stages from stage 1 to stage n. It is possible to proceed to the next stage by sequentially clearing each stage from stage 1, and a difficulty level gradually increases as the stage proceeds.

Figure 3:
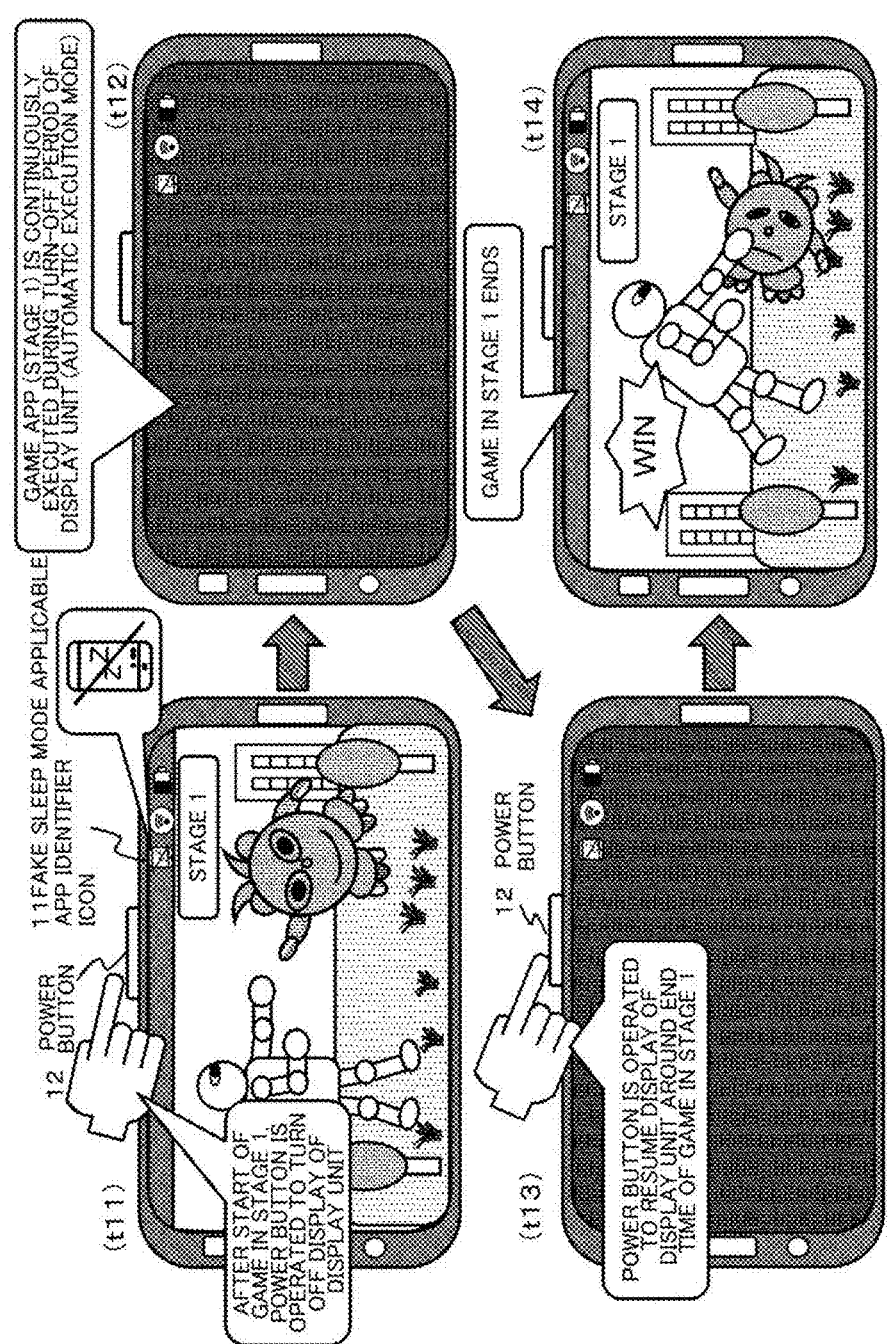
FIG. 3 is a diagram for describing the overview of the processing executed by the smartphone which is an example of the information processing device of the present disclosure.
Figure 4:
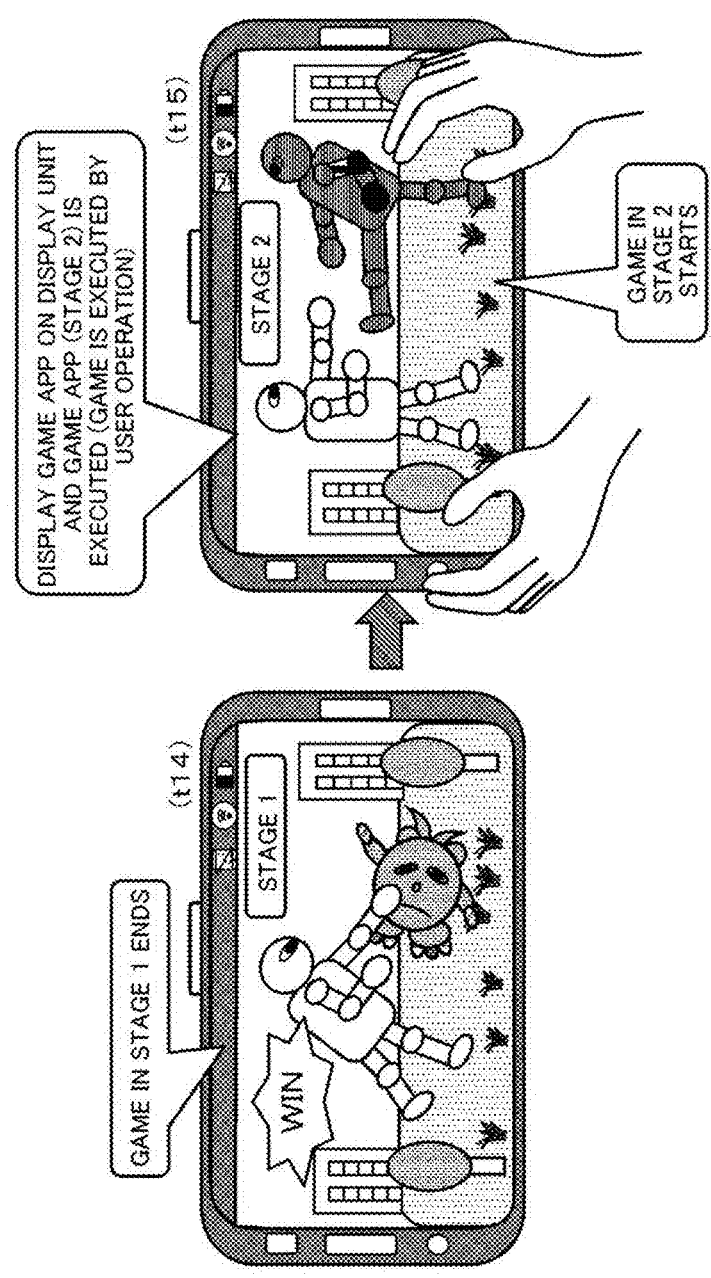
FIG. 4 is a diagram for describing the overview of the processing executed by the smartphone which is an example of the information processing device of the present disclosure.

FIGS. 3 and 4 illustrate examples of transitions of display data of the display unit of the smartphone 10 according to temporal changes ((t11) to (t15)).

Display data on the display unit of the smartphone 10 at time (t11) illustrated in the upper left of FIG. 3 corresponds to a game start screen of "stage 1" which is the first stage of the game app.

As described with reference to FIG. 1, "stage 1", which is the first stage, is a setting that can be cleared (won) only by the initial setting.

The user performs a predetermined initial setting on the start screen of "stage 1", and then, short presses the power button 12 of the smartphone. Note that a "short press" is not a "long press" in which a pressing state is continued for several seconds, but is button press processing in which the duration of the pressing state is shortened.

In a case where an app being executed by the smartphone 10 is a normal app, that is, the "fake sleep mode non-applicable app", the "short press" of the power button 12 of the smartphone makes the smartphone transition to the sleep state, and the display of the display unit is stopped, and the app being executed is also stopped.

However, in a case where the app being executed by the smartphone 10 is the "fake sleep mode applicable app", the "short press" of the power button 12 of the smartphone causes a transition to the "fake sleep mode".

In the "fake sleep mode", the display of the display unit is stopped, but the app is continuously executed even during a period in which the display of the display unit is stopped.

As illustrated in the upper left diagram of FIG. 3, when the user performs the "short press" of the power button 12 of the smartphone at time (t11), a transition to the "fake sleep mode" is made.

When the transition to the "fake sleep mode" is made, the display processing of the display unit of the smartphone 10 is stopped as illustrated at time (t12) in FIG. 3. This processing can reduce the battery consumption.

However, in the "fake sleep mode", the app being executed by the smartphone 10 is continuously executed even during such a display stop period.

In other words, during the period of the "fake sleep mode" from time (t12) to (t13) in FIG. 3, the display of the display unit of the smartphone 10 is stopped, but a battle in "stage 1" of the game app is continuously executed.

Thereafter, when the user performs the "short press" of the power button 12 of the smartphone again at time (t13) illustrated in FIG. 3 after a lapse of a predetermined time, the smartphone transitions from the "fake sleep mode" to the "normal operation mode".

In the "normal operation mode", the display processing of the display unit is resumed, and the app is also continuously executed without any change. An example of display data of the display unit of the smartphone 10 at a time point when the smartphone 10 transitions from the "fake sleep mode" to the "normal operation mode" is display data illustrated at time (t14) in FIG. 3.

The display data at this time (t14) corresponds to a game end screen of "stage 1". A state in which a robot on the user side wins against a character that is an enemy is illustrated.

It is possible to proceed to the next "stage 2" by winning at the battle in "stage 1".

A transition of the display data at time (t14) to (t15) illustrated in FIG. 4 illustrates an example of a transition from the end screen of "stage 1" to a game start screen of "stage 2".

In "stage 2", a battle with a character different from "stage 1" is carried out.

In "stage 2", the user performs an operation by himself/herself to battle with the enemy character in "stage 2".

A period set to the "fake sleep mode" at time (t12) to (t13) illustrated in FIG. 3 is, for example, 2 to 3 min, and corresponds to an app execution time of "stage 1" of the game app.

Since the display processing of the display unit of the smartphone 10 is stopped for the period of 2 to 3 min, it is possible to reduce the battery consumption of the smartphone 10 and to efficiently utilize the power-saving smartphone.

Note that examples of processing described with reference to FIGS. 2 to 4 are example of processing in a case where a battle game app is executed as an example of apps, but the app to which the processing of the present disclosure can be applied is not limited to such a battle game app.

The processing of the present disclosure is applicable to various types of game apps. Further, the processing of the present disclosure is applicable to various apps executed by smartphones as well as the game apps.

2. Details of Setting Mode and Mode Transition in Information Processing Device of Present Disclosure Next, details of setting modes and mode transitions in the information processing device of the present disclosure will be described.

The smartphone (information processing device) 10 of the present disclosure has at least the following four modes.

(1) Normal operation mode
(2) Fake sleep mode
(3) Sleep mode
(4) Power-off mode

These four modes will be described with reference to FIG. 5. FIG. 5 illustrates the following states (a) to (e) and processing in each mode.

(a) State of display unit
(b) Availability of call and message reception
(c) Execution or stop state of fake sleep mode applicable app (d) Execution or stop state of fake sleep mode non-applicable app (e) Lock state In "(1) Normal operation mode", the following states are obtained.

(a)

State of display unit = Display processing execution state (b)

Availability of call and message reception = Possible (c)

Execution or stop state of fake sleep mode applicable app = Execution (d)

Execution or stop state of fake sleep mode non-applicable app =

Execution (e)

Lock state = Unlocked state

In "(2) Fake sleep mode", the following states are obtained.

(a)

State of display unit = Display processing stop (turn-off) state (b)

Availability of call and message reception = Possible (c)

Execution or stop state of fake sleep mode applicable app = Execution (d)

Execution or stop state of fake sleep mode non-applicable app =

Mode transition is disabled (e)

Lock state = Unlocked state

Note that the fake sleep mode non-applicable app cannot transition to the fake sleep mode.

In "(3) Sleep mode", the following states are obtained.

(a)

State of display unit = Display processing stop (turn-off) state (b)

Availability of call and message reception = Possible (c)

Execution or stop state of fake sleep mode applicable app = Stop (d)

Execution or stop state of fake sleep mode non-applicable app = Stop (e)

Lock state = Locked state

In "(4) Power-off mode", the following states are obtained.

(a)

State of display unit = Display processing stop (turn-off) state (b)

Availability of call and message reception = Impossible (c)

Execution or stop state of fake sleep mode applicable app = Stop (d)

Execution or stop state of fake sleep mode non-applicable app = Stop (e)

Lock state = Locked state

Figure 6:
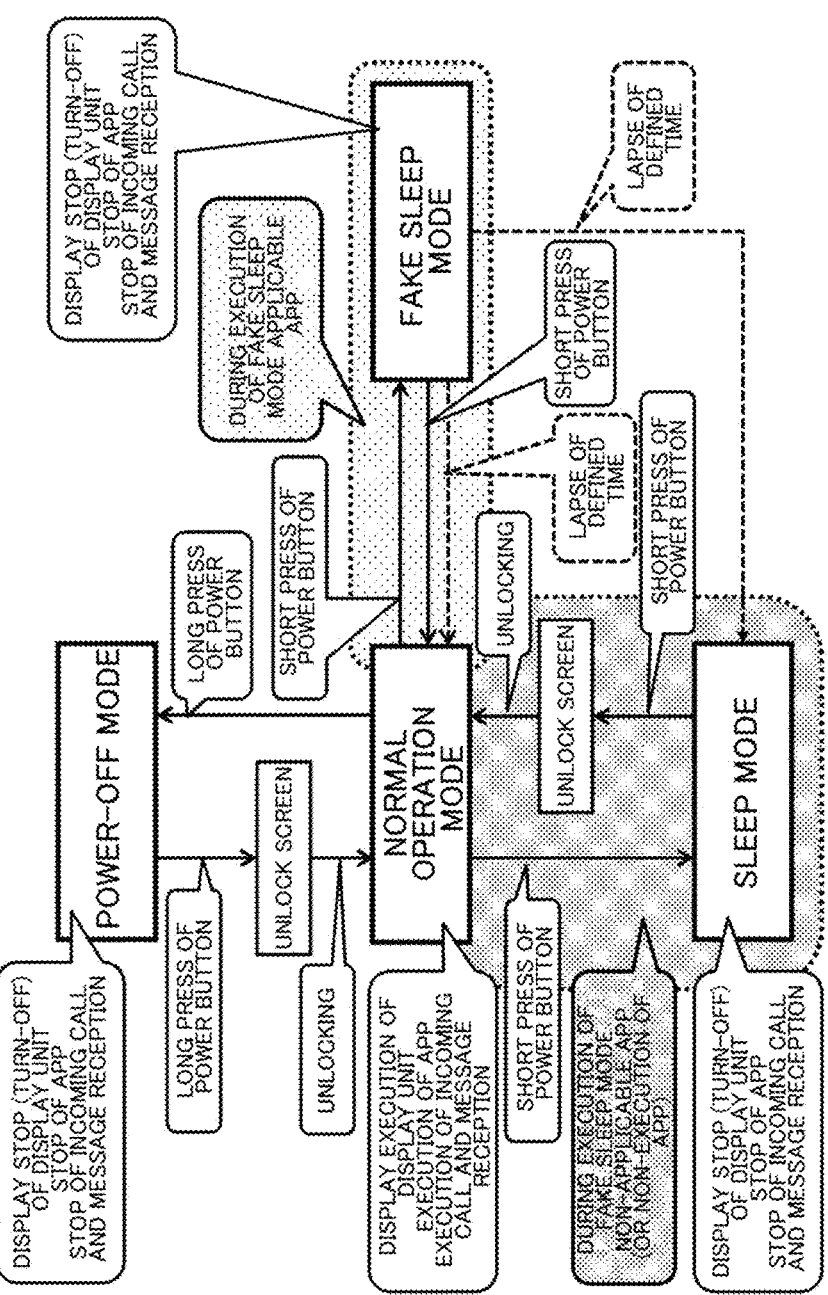
FIG. 6 is a diagram for describing details of transition processing of each mode executed in the smartphone of the present disclosure.

FIG. 6 is a diagram for describing details of transition processing of each mode executed in the smartphone (information processing device) 10 of the present disclosure.

In FIG. 6, "normal operation mode" is described in the center on the left, "power-off mode" is described in the upper left part, "sleep mode" is described in the lower left part, and "fake sleep mode" is described in the right part. Transitions between the modes are indicated by arrows.

For example, a transition from the "power-off mode" to the "normal operation mode" is executed by a "long press" of the power button of the smartphone. However, since lock processing of the smartphone has been performed in the "power-off mode", when the "long press" of the power button of the smartphone is performed in the "power-off mode", an "unlock screen" is first displayed. The "unlock screen" is, for example, a passcode input screen, a fingerprint authentication screen, or the like.

The user can cause the smartphone to transition from the "power-off mode" to the "normal operation mode" by executing predetermined unlock processing such as passcode input on the "unlock screen".

On the other hand, a transition from the "normal operation mode" to the "power-off mode" is executed by the user performing a "long press" of the power button of the smartphone in the "normal operation mode". Note that the smartphone transitions from the "unlocked state" to the "lock state" along with such transition processing.

In a case where the smartphone is in the "normal operation mode", the display unit is set to a display state, and the user can execute various apps such as a game app while displaying the various apps on the display unit.

In a case where the smartphone is in the "normal operation mode", when the user performs a "short press" of the power button of the smartphone, the smartphone transitions to any one of two modes of the "sleep mode" and the "fake sleep mode".

Whether to transition to either the "sleep mode" or the "fake sleep mode" varies depending on an app being executed in the "normal operation mode". In a case where the app being executed in the "normal operation mode" is the "fake sleep mode applicable app", when the user performs the "short press" of the power button of the smartphone, the smartphone transitions to the "fake sleep mode".

On the other hand, in a case where the app being executed in the "normal operation mode" is the "fake sleep mode non-applicable app", when the user performs the "short press" of the power button of the smartphone, the smartphone transitions to the "sleep mode".

In addition, in a case where there is no app being executed in the "normal operation mode" and the user performs the "short press" of the power button of the smartphone, the smartphone transitions to the "sleep mode".

The user can set either the "fake sleep mode applicable app" or the "fake sleep mode non-applicable app" in advance on an app-by-app basis, and can also perform setting change processing. A specific example of this processing will be described later.

As illustrated in FIG. 6, in a case where the app being executed in the "normal operation mode" is the "fake sleep mode applicable app", when the user performs the "short press" of the power button of the smartphone, the smartphone transitions to the "fake sleep mode".

When the smartphone transitions to the "fake sleep mode", the display of the display unit of the smartphone is stopped (turned off). However, the app being executed in the "normal operation mode" is continuously executed even after the smartphone transitions to the "fake sleep mode".

For example, in a case where the app being executed in the "normal operation mode" is a game app, the game app is continuously executed so that a game progresses even after the smartphone transitions to the "fake sleep mode".

When the user performs the "short press" of the power button of the smartphone in a state in which the smartphone is in the "fake sleep mode", the smartphone transitions from the "fake sleep mode" to the "normal operation mode". In the "normal operation mode", the display of the display unit is resumed. At this time point, the user can check, for example, a game screen after the progress of the game app that has progressed in the "fake sleep mode" period.

Note that, as indicated by a "dotted arrow" in FIG. 6, in a case where the user does not perform the "short press" of the power button of the smartphone within a predefined time in a state in which the smartphone is in the "fake sleep mode", the smartphone may be set to transition from the "fake sleep mode" to the "normal operation mode" or the "sleep mode".

The user can also determine whether or not to perform this setting in advance on an app-by-app basis.

On the other hand, as illustrated in FIG. 6, in a case where the app being executed in the "normal operation mode" is the "fake sleep mode non-applicable app", when the user performs the "short press" of the power button of the smartphone, the smartphone transitions to the "sleep mode".

When the smartphone transitions to the "sleep mode", the display of the display unit of the smartphone is stopped (turned off). In addition, the app being executed in the "normal operation mode" is also stopped at a time point when the smartphone transitions to the "sleep mode".

For example, in a case where the app being executed in the "normal operation mode" is a game app, the game app is stopped when the smartphone transitions to the "sleep mode".

Further, in a case where the smartphone transitions to the "sleep mode", the smartphone is set to the lock state.

When the user performs the "short press" of the power button of the smartphone in a state in which the smartphone is in the "sleep mode", the "unlock screen" is displayed on the smartphone. As described above, the "unlock screen" is, for example, a passcode input screen, a fingerprint authentication screen, or the like.

The user can cause the smartphone to transition from the "sleep mode" to the "normal operation mode" by executing predetermined unlock processing such as passcode input on the "unlock screen".

In the "normal operation mode", the display of the display unit is resumed. However, at this time point, since the app such as a game app executed by the user before the transition to the "sleep mode" is stopped in a state at the time of the transition to the "sleep mode", when the user resumes the app, it is necessary to resume from the state at the time of the transition to the "sleep mode".

As understood from the description with reference to FIG. 6, in a case where the app being executed in the "normal operation mode" of the smartphone is the "fake sleep mode applicable app", when the user performs the "short press" of the power button of the smartphone, the smartphone transitions to the "fake sleep mode", and the display of the display unit is stopped, but the app is continuously executed.

Thereafter, when the user performs the "short press" of the power button of the smartphone, the smartphone transitions to the "normal operation mode", and the user can immediately start the app such as a game app from the screen after the progress in the "fake sleep mode" period.

Since such processing is possible, it is possible to stop the display of the game screen or the like that the user does not need to view, and it is possible to reduce unnecessary battery consumption.

In addition, in a case where the transition from the "fake sleep mode" to the "normal operation mode", it is not necessary to perform the unlock processing or activation processing of a new app, and the operation required by the user is reduced, and the burden on the user is also reduced.

3. Processing of Setting "Fake Sleep Mode Applicable App" and Configuration Example of User Interface (UI) Used for Setting Processing Next, processing of setting an app to the "fake sleep mode applicable app" and a configuration example of a user interface (UI) used for the setting processing will be described.

There are a large number of apps (applications) of various types executed on the smartphone.

The smartphone, which is the information processing device of the present disclosure, can set either the "fake sleep mode applicable app" or the "fake sleep mode non-applicable app" for each of the apps executed on the smartphone.

Figure 7:
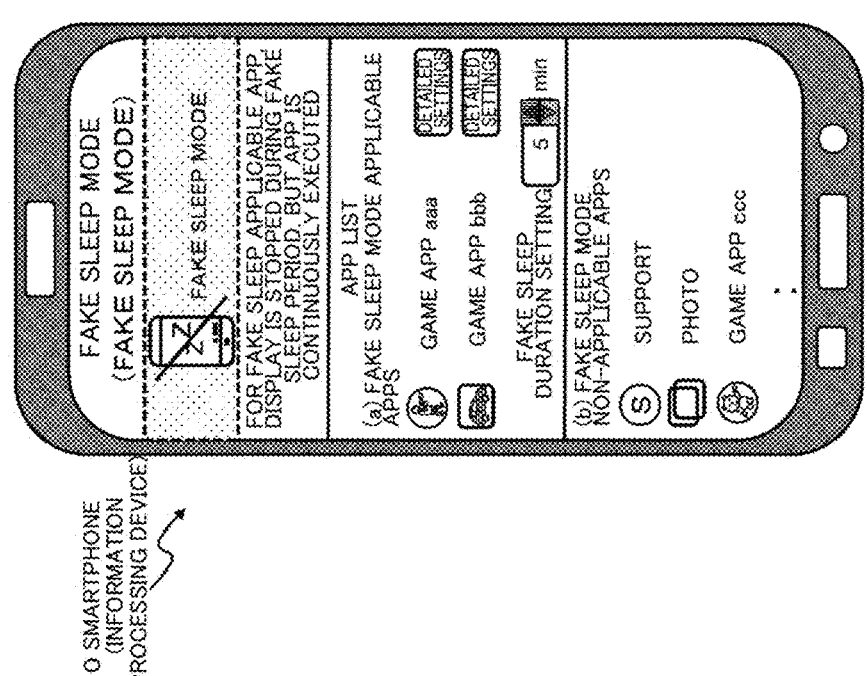
FIG. 7 is a diagram for describing processing of setting an app to a "fake sleep mode applicable app" and a configuration example of a user interface (UI) used for the setting processing.

With reference to FIG. 7 and the subsequent figures, the processing of setting an app to the "fake sleep mode applicable app" and the configuration example of the user interface (UI) used for the setting processing.

FIG. 7 is a diagram illustrating an example of the user interface (UI) for setting the "fake sleep mode applicable app" on an app-by-app basis.

On the display unit of the smartphone (information processing device) 10, the UI for determining and setting whether to set the "fake sleep mode applicable app" or the "fake sleep mode non-applicable app" on an app-by-app basis is displayed.

An "app list" illustrated in the middle row and lower rows of the display unit of the smartphone 10 includes a list of apps of the following two categories.

An app list of (a) Fake sleep mode applicable apps

An app list of (b) Fake sleep mode non-applicable apps

In the example illustrated in the figure,

In the list of "(a) Fake sleep mode applicable apps", two game apps of

Game app aaa and

Game app bbb are displayed.

On the other hand, in the list of "(b) Fake sleep mode non-applicable apps", three apps of Support, Photo, and Game app ccc are displayed.

Note that "Fake sleep duration setting (5 min)" indicated at the end of the list of the "(a) Fake sleep mode applicable apps" is an item for setting the maximum duration of the "fake sleep mode" in a case where an app in the list of the "(a) Fake sleep mode applicable apps" is set to the "fake sleep mode".

In the example illustrated in the figure, the maximum duration in a case where an app in the list of "(a) Fake sleep mode applicable apps" is set to the "fake sleep mode" is set to 5 min. In this case, when more than 5 min elapses after a transition of an app in the list to the "fake sleep mode", the app returns to the original "normal operation mode" or transitions to the "sleep mode" even if the user does not operate the power button.

Note that a time setting of the maximum duration and a transition mode after the lapse of the maximum duration can be individually set on an app-by-app basis. An example of the setting on an app-by-app basis will be described later.

The user can use the UI illustrated in FIG. 7 to set and change whether to perform the setting to either "(a) Fake sleep mode applicable apps" or "(b) Fake sleep mode non-applicable apps" on an app-by-app basis.

For example, in a case where it is desired to change one app in the list of "(a) Fake sleep mode applicable apps" to "(b) Fake sleep mode non-applicable app", the user selects the app from the list of (a) and performs drag and drop processing to move the selected app to the list of (b).

Conversely, in a case where it is desired to change one app in the list of "(b) Fake sleep mode non-applicable apps" to "(a) Fake sleep mode applicable app", the user selects the app from the list of (b) and performs drag and drop processing to move the selected app to the list of (a).

Figure 8:
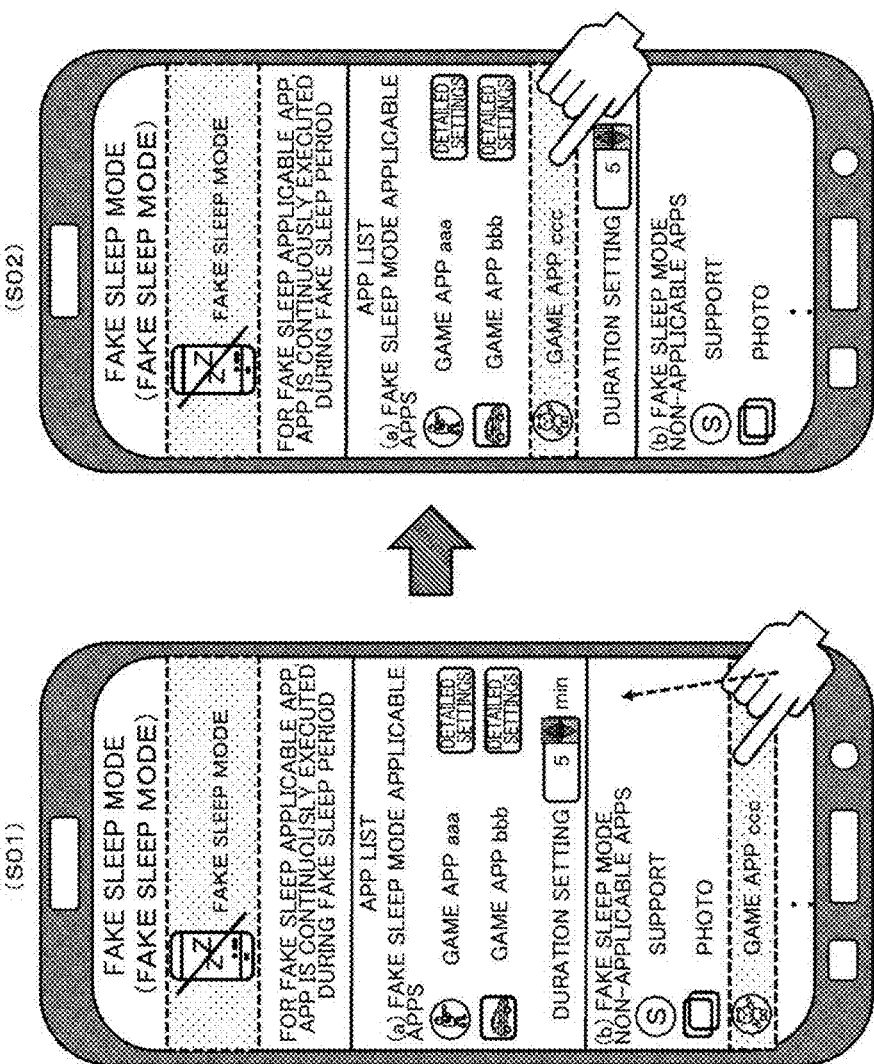
FIG. 8 is a diagram for describing the processing of setting an app to the "fake sleep mode applicable app" and the configuration example of the user interface (UI) used for the setting processing.

A specific example of this processing will be described with reference to FIG. 8. FIG. 8 illustrates an example of processing when one app in the list of "(b) Fake sleep mode non-applicable apps", that is, "Game app ccc" is changed to "(a) Fake sleep mode applicable app".

In this case, as illustrated in (S01) of FIG. 8, the user first selects "Game app ccc" in the list of "(b) Fake sleep mode non-applicable apps". Thereafter, the user performs drag and drop processing of moving the selected app "Game app ccc" into the list of "(a) Fake sleep mode applicable apps" as illustrated in (S01) and (S02) of FIG. 8.

By this drag and drop process, "Game app ccc" is changed from "(b) Fake sleep mode non-applicable app" to "(a) Fake sleep mode applicable app".

For each app in the list of "(a) Fake sleep mode applicable apps", detailed settings regarding the "fake sleep mode" on an app-by-app basis can be further performed by touching the "detailed settings" on the right side of each app in the list.

A specific example of detailed setting processing related to the "fake sleep mode" on an app-by-app basis will be described with reference to FIG. 9 and the subsequent figures.

Figure 9:
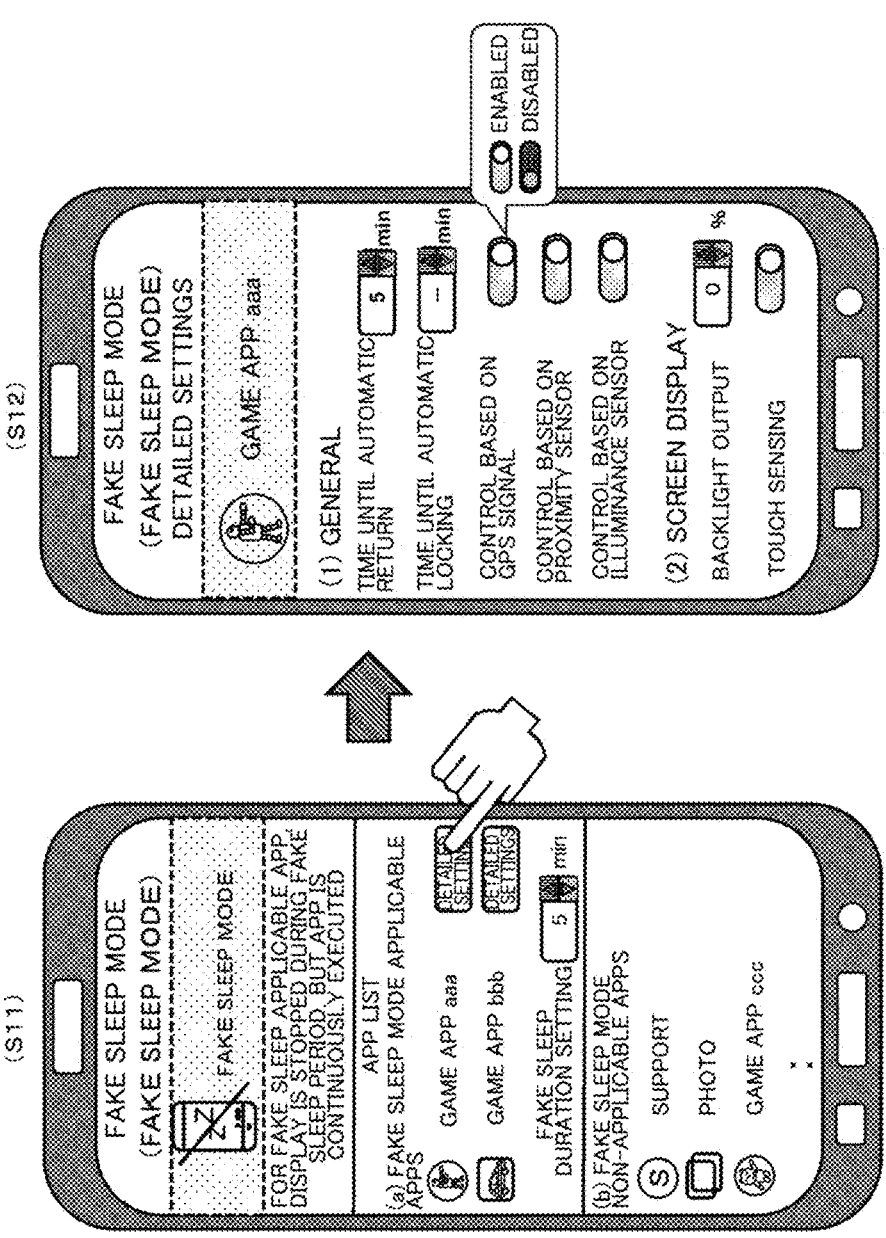
FIG. 9 is a diagram for describing a specific example of detailed setting processing related to a "fake sleep mode" on an app-by-app basis.

FIG. 9 and the subsequent figures illustrate examples of processing in the case of performing detailed setting processing for "Game app aaa" which is one app in the list of "(a) Fake sleep mode applicable apps".

First, as illustrated in (S11) of FIG. 9, the user touches "detailed settings" on the right side of "Game app aaa" which is one app in the list of "(a) Fake sleep mode applicable apps".

With this processing, a detailed setting UI related to the "fake sleep mode" of "Game app aaa" illustrated in (S12) of FIG. 9 is displayed.

Figure 10:
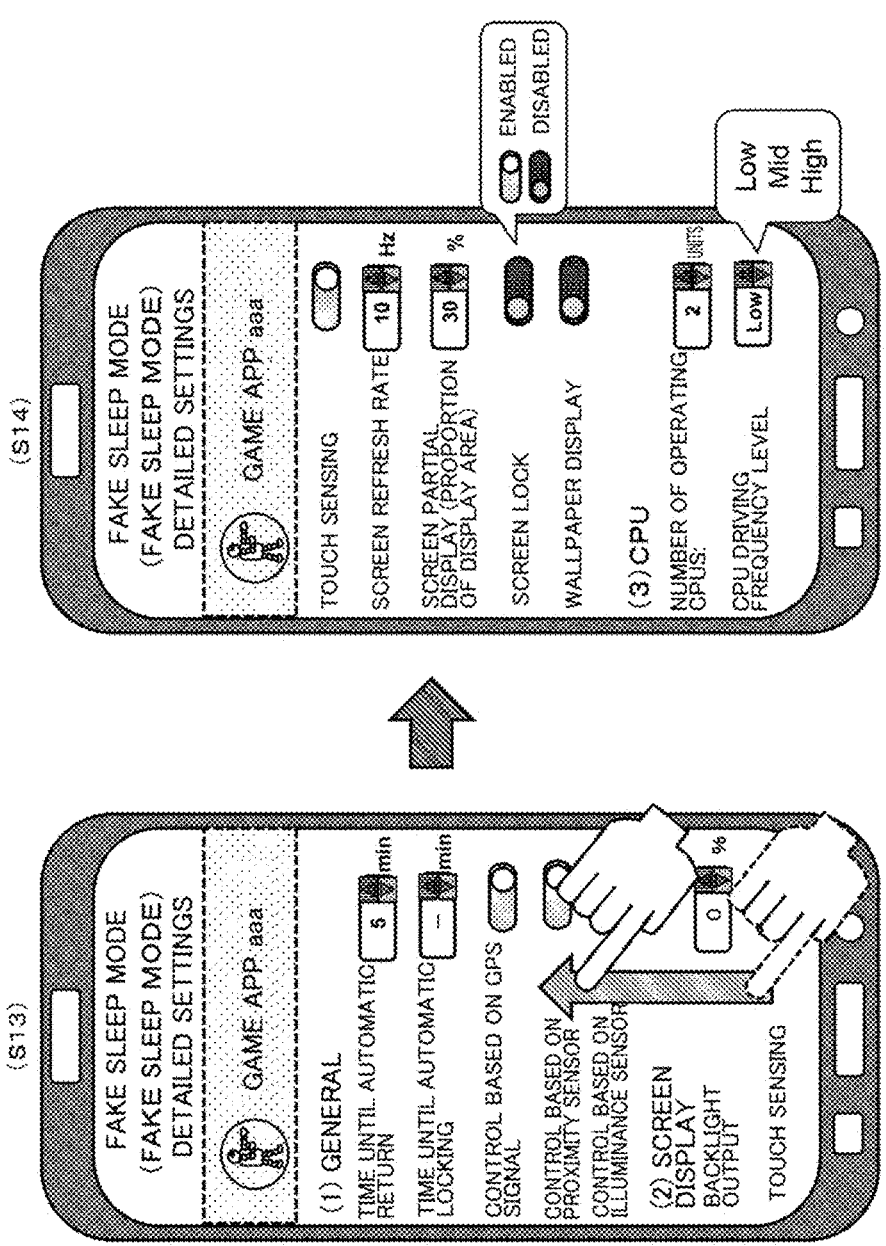
FIG. 10 is a diagram for describing a specific example of detailed setting processing related to a "fake sleep mode" on an app-by-app basis.

Note that a UI illustrated in (S12) of FIG. 9 is a part of the detailed setting UI related to the "fake sleep mode" of "Game app aaa", and as illustrated in (S13) and (S14) of FIGS. 10, the user can scroll a screen to display still other setting items.

As illustrated in FIGS. 9 and 10, the detailed setting UI related to the "fake sleep mode" on an app-by-app basis is divided into three categories of (1) General, (2) Screen display, and (3) CPU, and has a configuration in which detailed settings in units of these three categories are possible.

The following setting items are displayed in a setting field of "(1) General".

*Time until automatic return

*Time until automatic locking

*Control based on GPS signal

*Control based on proximity sensor

*Control based on illuminance sensor

"*Time until automatic return" is an item for setting an elapsed time until the app is returned to the original "normal operation mode" in a case where time has elapsed without the "short press" of the power button by the user since a transition of an app to the "fake sleep mode".

In the example illustrated in the figure, 5 min is set. In this setting, in a case where 5 min has elapsed without the "short press" of the power button by the user since a transition of "App aaa" to the "fake sleep mode", the "normal operation mode" is restored.

"*Time until automatic locking" is an item for setting an elapsed time until "lock processing" is performed in a case where time has elapsed without the "short press" of the power button by the user since a transition of an app to the "fake sleep mode".

When the "lock processing" is executed, it is necessary to perform unlocking in order to return to the "normal operation mode".

The unlocking is, for example, passcode input or fingerprint authentication processing.

Note that, when the "lock processing" is executed, the "fake sleep mode" transitions to the "sleep mode".

In the example illustrated in the figure, since "*time until automatic locking" is not set (-), the "lock processing" is not executed even in a case where time has elapsed without the "short press" of the power button by the user since the transition of "App aaa" to the "fake sleep mode".

"*Control based on GPS signal" is an item for setting whether or not to execute automatic transition processing from the "normal operation mode" to the "fake sleep mode" based on position information detected by the smartphone 10 based on a GPS signal.

This is, for example, processing for preventing execution of a game app during driving in a vehicle.

In a case where the setting of "*Control based on GPS signal" is set to "enabled", for example, the following mode transition processing is automatically executed. That is, in a case where it is determined that the smartphone 10 is moving in the vehicle based on the GPS signal, the "normal operation mode" automatically transitions to the "fake sleep mode".

Since such an automatic transition is executed, it is possible to forcibly stop the game play using the smartphone during driving.

"*Control based on proximity sensor" is an item for setting whether or not to execute automatic transition processing from the "normal operation mode" to the "fake sleep mode" based on a detection signal of a proximity sensor of the smartphone 10.

In a case where the setting of "*Control based on proximity sensor" is set to "enabled", for example, the following mode transition processing is automatically executed.

For example, in a case where a call is received while a game app is being executed in the "normal operation mode" of the smartphone 10, the user brings the smartphone close to the ear. In such a case, the proximity sensor of the smartphone detects that the display unit of the smartphone is close to an object (in this case, the ear), and automatically transitions from the "normal operation mode" to the "fake sleep mode".

In addition, for example, also in a case where the display unit side of the smartphone 10 is laid down on a table or put in a pocket, the proximity sensor of the smartphone detects that the display unit of the smartphone is close to an object (in this case, the table or the pocket), and automatically transitions from the "normal operation mode" to the "fake sleep mode".

Since such processing is executed, when the user is not looking at the display unit, it is possible to stop the display of the display unit and reduce the unnecessary battery consumption.

"*Control based on illuminance sensor" is an item for setting whether or not to execute automatic transition processing from the "normal operation mode" to the "fake sleep mode" based on a detection signal of an illuminance sensor of the smartphone 10.

In a case where the setting of "*Control based on illuminance sensor" is set to "enabled", for example, the following mode transition processing is automatically executed.

For example, in a case where the display unit side of the smartphone 10 is laid down on a table or put in a pocket while a game app is being executed in the "normal operation mode" of the smartphone 10, the illuminance sensor of the smartphone detects that the display unit of the smartphone is blocked by some object (in this case, the table or the pocket), and automatically transitions from the "normal operation mode" to the "fake sleep mode".

Since such processing is executed, when the user is not looking at the display unit, it is possible to stop the display of the display unit and reduce unnecessary battery consumption.

Further, the following setting items are displayed in a setting field of "(2) Screen display".

*Backlight output
*Touch sensing
*Screen refresh rate
*Screen partial display (proportion of display area)
*Screen lock
*Wallpaper display "*Backlight output" is an item for setting an output of backlight in a case where the smartphone 10 is set to the "fake sleep mode".

The backlight output can be set between 0% (completely off) and 100% (maximum output), and when the output is set to 0%, the backlight is completely turned off in the "fake sleep mode". For example, with the output set to 10% to 20%, slight brightness is felt in the "fake sleep mode". With such a setting, it is also possible to recognize a difference from the sleep mode.

"*Touch sensing" is an item for setting whether or not to enable a touch sensor of the display unit in a case where the smartphone 10 is set to the "fake sleep mode".

In a case where the setting is enabled, a touch can be effectively detected when the user touches the display unit even in the "fake sleep mode".

For example, it is possible to perform processing of making a transition from the "fake sleep mode" to the "normal operation mode" by the user's screen touch.

"*Screen refresh rate" is an item for setting a screen refresh rate of the display unit in a case where the smartphone 10 is set to the "fake sleep mode".

The screen refresh rate corresponds to a rewrite rate of display data displayed on the display unit of the smartphone 10.

If the screen refresh rate is increased, display data with a faster image change can be output, but power consumption increases.

On the other hand, if the screen refresh rate is decreased, the display image change becomes gentle, but the power consumption can be reduced.

Note that, in a case where screen display is completely set to off (backlight output=0) in the "fake sleep mode", it is unnecessary to set the refresh rate.

In a case where the backlight output is not set to be zero, that is, in a case where dark screen display or the like is performed, the power consumption can be further reduced by decreasing the refresh rate in the "fake sleep mode".

A specific example of refresh rate control processing executed in the smartphone 10 will be described with reference to FIG. 11.

Figure 11:
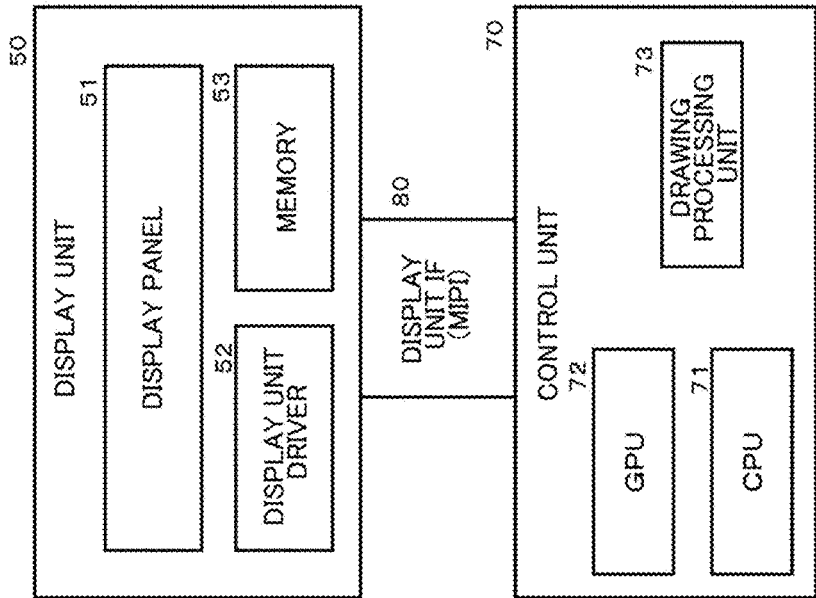
FIG. 11 is a diagram for describing a specific example of refresh rate control processing executed in the smartphone.

FIG. 11 illustrates a configuration example of a display unit 50 and a control unit 70 in the smartphone 10. The control unit 70 generates an image to be displayed on the display unit 50 and outputs the image to the display unit 50 via a display unit interface (IF) 80.

The control unit 70 executes execution control of various apps, and generation processing and drawing processing of display data to be output to the display unit 50.

The control unit 70 includes a CPU 71, a GPU 72, and a drawing processing unit 73.

The CPU 71 performs execution control of apps such as a game app. For example, development and progress of the game app are controlled according to a user operation or a user setting.

The GPU 72 performs processing of generating graphic data for generating a screen of the game app that progresses under the control of the CPU 71, and the like.

The drawing processing unit 73 executes the drawing processing of display data to be output to the display unit 50 using the graphic data generated by the GPU 72.

The display data generated by the drawing processing unit 73 is periodically output to the display unit 50 via the display unit interface (IF) 80. The display unit interface (IF) 80 is, for example, a mobile industry processor interface (MIPI).

The display unit 50 includes a display unit driver 51, a display panel 52, and a memory 53.

The display data generated by the drawing processing unit 73 is received by the display unit driver 51 of the display unit 50.

The display unit driver 51 outputs the display data input from the drawing processing unit 73 to the display panel 52.

An output rate of the display data to the display panel 52 by the display unit driver 51 corresponds to the refresh rate.

Note that, as a method of outputting display data to the display panel 52 by the display unit driver 51, the following two methods exist.

Command mode method

Video mode method

The "command mode method" is a method in which the display unit driver 51 outputs new display data to the display panel 52 only at a timing when display data being displayed on the display panel 52 is changed.

In this method, the display data being displayed on the display panel 52 is stored in the memory 53, and the display unit driver 51 refreshes (rewrites) the display data of the display panel 52 at a defined refresh rate using display data stored in the memory 53.

When new display data is not input from the drawing processing unit 73 of the control unit 70, the display unit driver 51 refreshes (rewrites) the display data of the display panel 52 at the defined refresh rate using the display data stored in the memory 53.

On the other hand, when new display data is input from the drawing processing unit 73 of the control unit 70, the new display data is stored in the memory 53, and the display unit driver 51 refreshes (rewrites) the display data of the display panel 52 using the new display data stored in the memory 53.

On the other hand, the "video mode method" is a method in which the display data being displayed on the display panel 52 is not stored in the memory 53, and the display unit driver 51 refreshes (rewrites) the display data of the display panel 52 using the display data input from the drawing processing unit 73 of the control unit 70 at a time interval according to the defined refresh rate.

In both the methods, the refresh (rewrite) of the display data of the display panel 52 is executed according to the defined refresh rate.

A "screen refresh rate" set using a UI illustrated in FIG. 10 is an item for setting such a refresh rate.

As described above, if the screen refresh rate is increased, display data with a faster image change can be output, but power consumption increases. On the other hand, if the screen refresh rate is decreased, the display image change becomes gentle, but the power consumption can be reduced.

Returning to FIG. 10, the description of the detailed setting UI of the "fake sleep mode" on an app-by-app basis will be continued.

"*Screen partial display (proportion of display area)" is an item for setting a display area of an app execution screen, for example, a game screen, to be displayed on the display unit of the smartphone 10 in a case where the smartphone 10 is set to the "fake sleep mode".

For example, in the example illustrated in FIG. 10, "*Screen partial display (proportion of display area)"=30% is set.

In this setting, in a case where the smartphone 10 is set to the "fake sleep mode", the display of the game screen on the display unit of the smartphone 10 is not completely stopped, but the game screen is displayed only in an area that accounts for 30% of the display unit of the smartphone 10.

A specific example of a partial display example of the game screen will be described with reference to FIG. 12.

Figure 12:
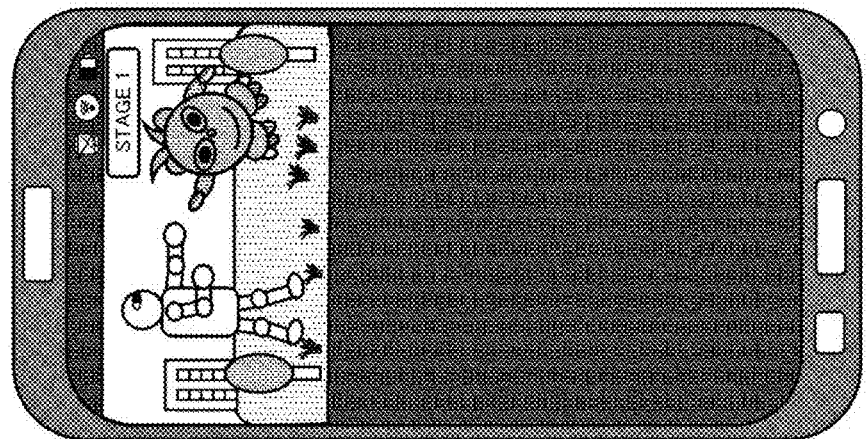
FIG. 12 is a diagram for describing a specific example of a partial display example of a game screen.

The example illustrated in FIG. 12 is a game screen display example in the "fake sleep mode" in a case where "*Screen partial display (proportion of display area)" is set to be 30%.

As illustrated in FIG. 12, it is possible to reduce power consumption by displaying the app execution screen not in the entire display unit of the smartphone 10 but only in a part (the area that accounts for 30% in the example of the figure).

Returning to FIG. 10, the description of the detailed setting UI of the "fake sleep mode" on an app-by-app basis will be continued.

"*Screen lock" is an item for setting whether or not to perform lock processing at a timing when the smartphone 10 transitions to the "fake sleep mode".

In this item, in a case where "*Screen lock" is set to be enabled, the "lock processing" is performed at a timing when the transition to the "fake sleep mode" is made during the execution of the app. In this case, it is necessary to perform unlock processing to return from the "fake sleep mode" to the "normal operation mode".

The unlock processing is, for example, passcode input processing, fingerprint authentication processing, or the like.

"*Wallpaper display" is an item for setting whether or not to display predefined wallpaper instead of completely turning off the screen display when the smartphone 10 has transitioned to the "fake sleep mode".

In a case where "*Wallpaper display" is set to be enabled, when the transition to the "fake sleep mode" is made during the execution of the app, information of the predefined wallpaper is displayed instead of the app execution screen.

Figure 13:
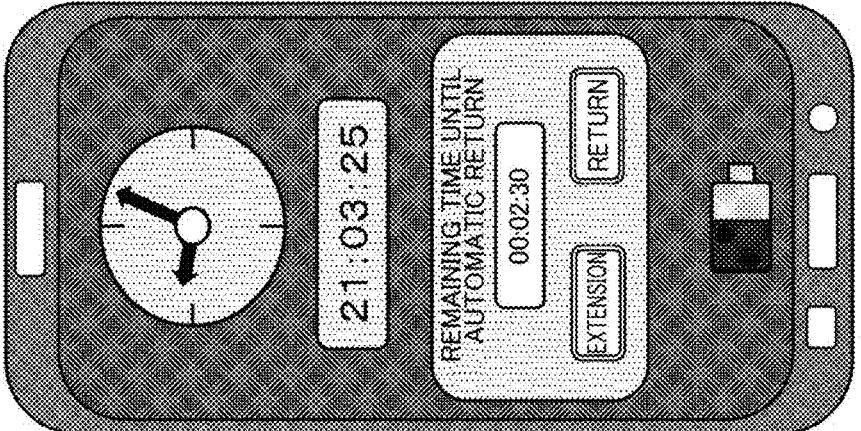
FIG. 13 is a diagram for describing a specific example of wallpaper.

A specific example of the wallpaper will be described with reference to FIG. 13. FIG. 13 illustrates an example of the wallpaper displayed in the "fake sleep mode" period.

The example of the wallpaper illustrated in FIG. 13 is wallpaper including a clock, a time until a transition to another mode, an extension button of the fake sleep mode, an immediate return button to the "normal operation mode", and remaining battery capacity information.

This wallpaper data can be displayed with extremely less power as compared with power required to display a normal app execution screen, and can reduce battery consumption during the "fake sleep mode" period.

The UIs described with reference to FIGS. 7 to 11 are the UI used for setting either the "fake sleep mode applicable app" or the "fake sleep mode non-applicable app" on an app-by-app basis, and the UI for performing the detailed settings on an app-by-app basis of the "fake sleep mode applicable app".

Figure 14:
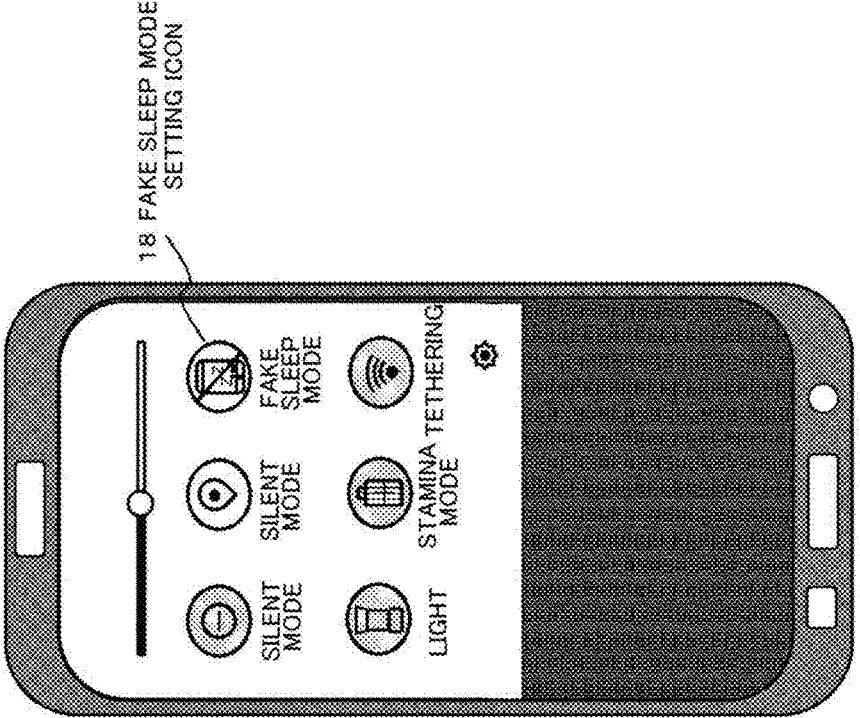
FIG. 14 is a diagram for describing an example of a UI for performing settings applied in common to all apps stored in the smartphone in common.

In addition to these UIs, a UI that collectively sets all the apps stored in the smartphone 10 to the "fake sleep mode applicable apps" may be used, for example, as illustrated in FIG. 14.

A UI illustrated in FIG. 14 is an example of the UI for performing settings applied in common to all the apps stored in the smartphone 10.

In the upper right part of the UI illustrated in FIG. 14, a "fake sleep mode setting icon 18" is displayed.

When the user touches the "fake sleep mode setting icon 18", all the apps stored in the smartphone 10 can be collectively set to the "fake sleep mode applicable apps".

Note that, thereafter, if the "fake sleep mode setting icon 18" is touched again, all the apps stored in the smartphone 10 can be collectively returned to the "fake sleep mode non-applicable apps".

An example of an icon operation will be described with reference to FIG. 15. In (S21) illustrated in FIG. 15, the "fake sleep mode setting icon 18" is in a darkened state. This state is a state in which all the apps stored in the smartphone 10 are set to the "fake sleep mode non-applicable apps".

Figure 15:
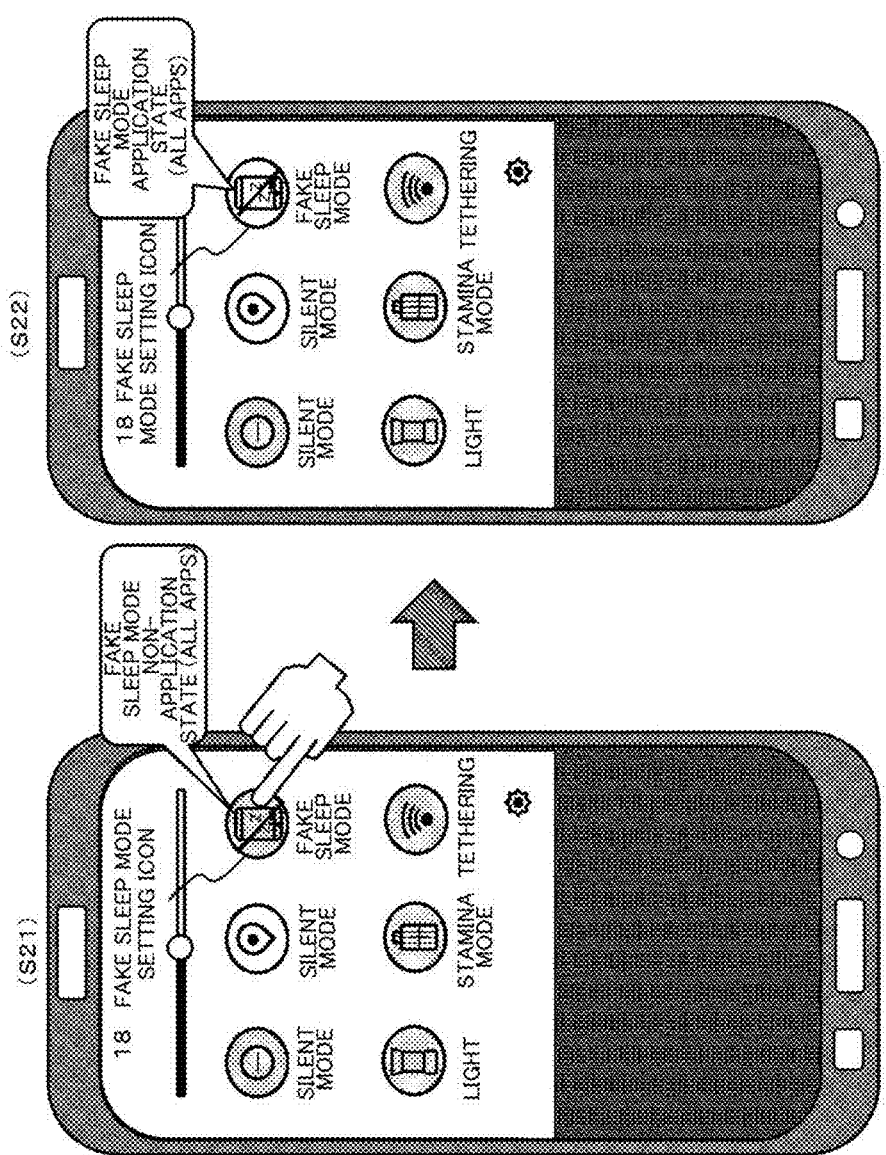
FIG. 15 is a diagram for describing an example of an icon operation of the UI for performing the settings applied in common to all the apps stored in the smartphone.

When the user touches this darkened icon, the "fake sleep mode setting icon 18" can be displayed to be bright, that is, brightened as illustrated in (S22) of FIG. 15. When this state is set, all the apps stored in the smartphone 10 can be set to the "fake sleep mode applicable apps".

In this manner, all the apps stored in the smartphone 10 can be set to the "fake sleep mode applicable apps" or can be set to the "fake sleep mode non-applicable apps" by performing touch processing on the "fake sleep mode setting icon 18" to execute brightening or darkening of the icon.

Figure 16:
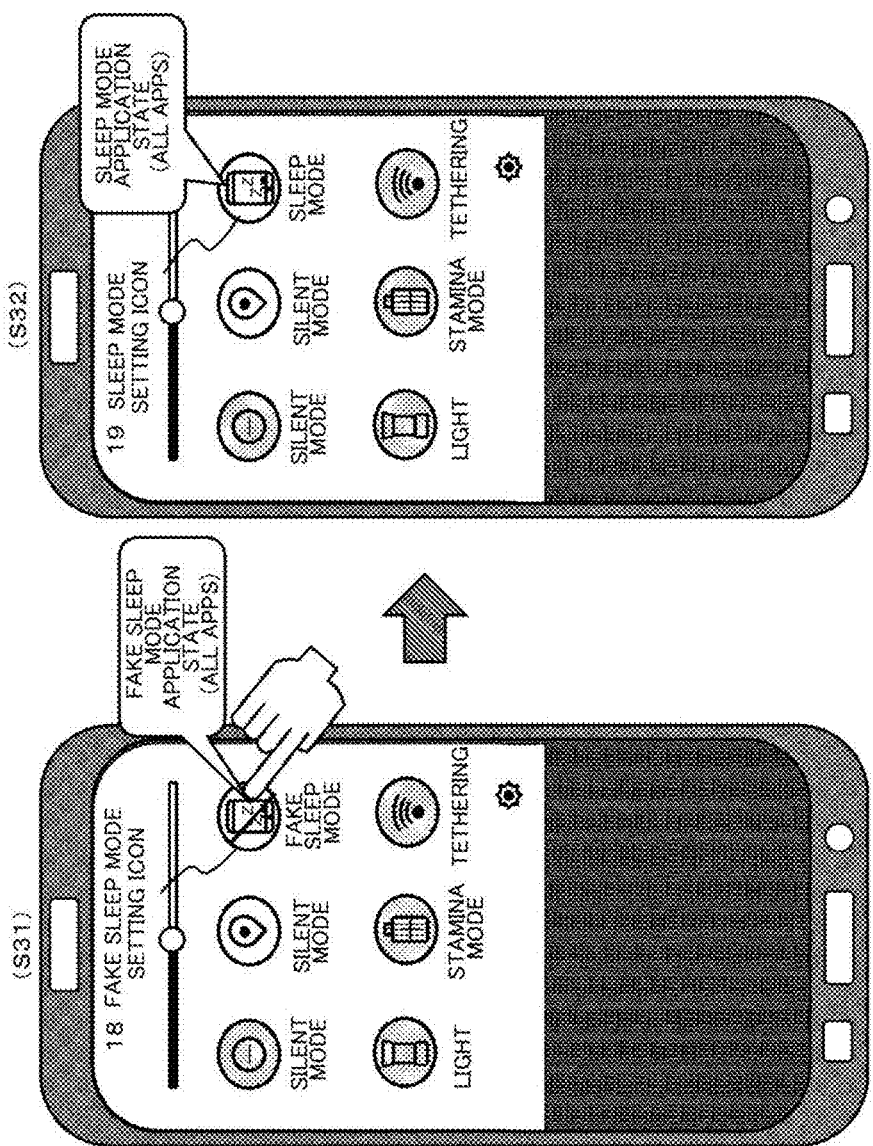
FIG. 16 is a diagram for describing an example of an icon operation of the UI for performing the settings applied in common to all the apps stored in the smartphone.

In addition, as an example different from the example described with reference to FIG. 15, a configuration in which the "fake sleep mode setting icon 18" and a "sleep mode setting icon 19" is switched and displayed by the user's touch processing on the icons may be adopted, for example, as illustrated in FIG. 16.

Further, it is also possible to adopt a configuration in which either the "fake sleep mode applicable app" or the "fake sleep mode non-applicable app" can be set on an app-by-app basis using a UI similar to the UI described with reference to FIGS. 14 to 16.

Figure 17:
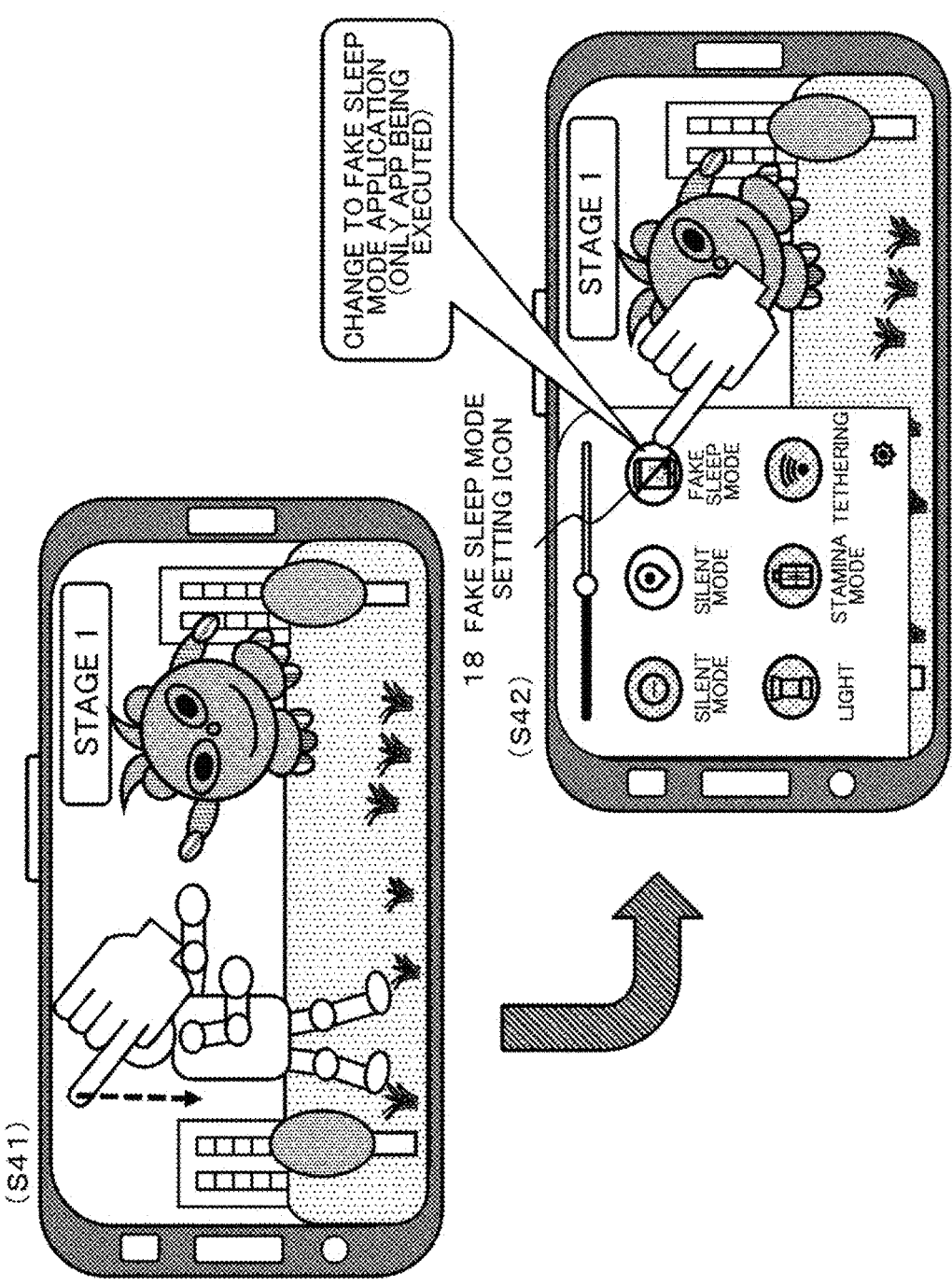
FIG. 17 is a diagram for describing a specific example of a configuration in which either a "fake sleep mode applicable app" or a "fake sleep mode non-applicable app" can be set on an app-by-app basis.

A specific example is illustrated in FIG. 17.

The example illustrated in FIG. 17 illustrates a state in which one certain app (game app) is executed in the smartphone 10.

When such an app is executed, the user performs processing of swiping the upper left portion of the screen as illustrated in (S41) of FIG. 17.

By this swipe processing, a UI as illustrated in (S42) of FIG. 17 is displayed. This UI is a UI for performing settings applied only to the app being executed.

For example, as illustrated in (S42) of FIG. 17, the user can set the app currently being executed to the "fake sleep mode applicable app" by touching the "fake sleep mode setting icon 18" in the upper right part of the UI to change the "fake sleep mode setting icon 18" from the darkened state to the brightened state.

Note that the app currently being executed can be set to the "fake sleep mode non-applicable app" by touching the "fake sleep mode setting icon 18" in the brightened state to make a change from the brightened state to the darkened state.

In addition, it is also possible to adopt a configuration in which whether to enable or disable the fake sleep mode can be set for the "fake sleep mode applicable app" using a UI similar to the UI described with reference to FIGS. 14 to 16.

Figure 18:
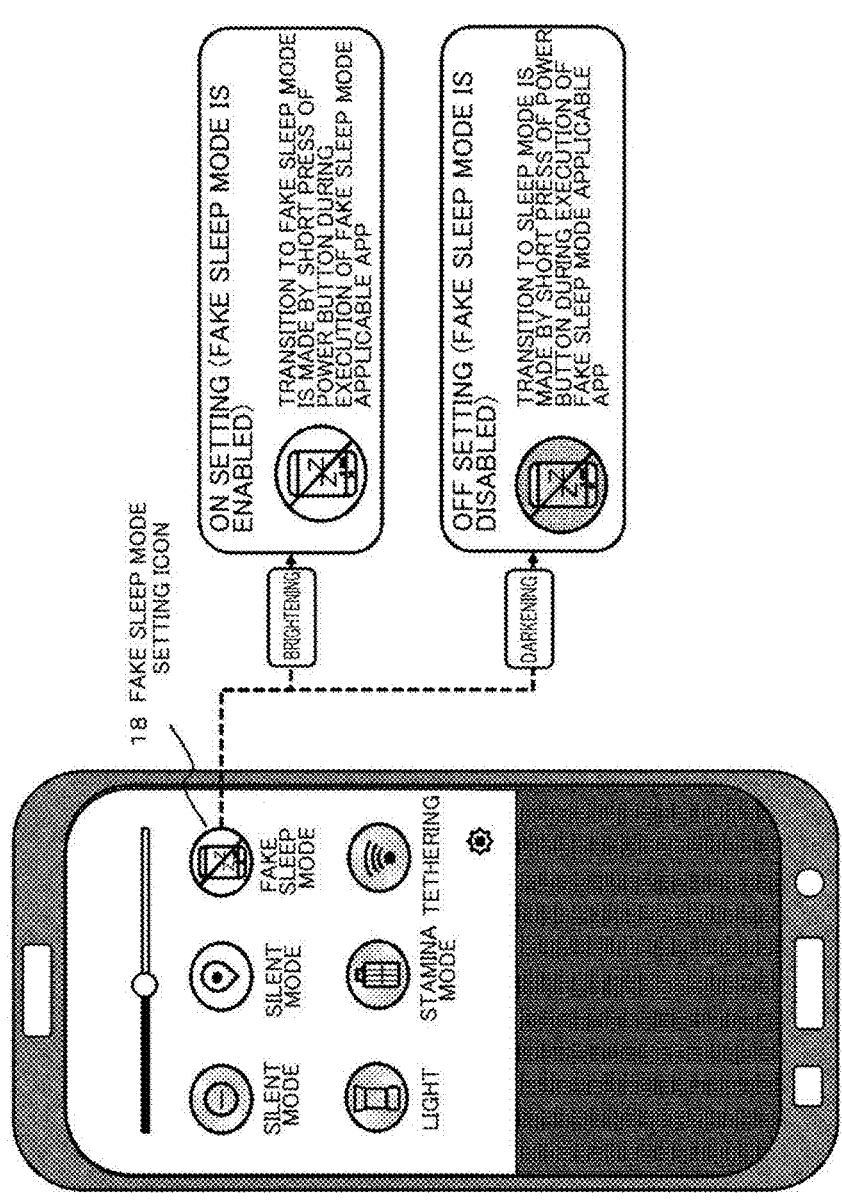
FIG. 18 is a diagram for describing an example of a UI in which whether to enable or disable a fake sleep mode can be set for the fake sleep mode applicable app.

A specific example is illustrated in FIG. 18.

The "fake sleep mode setting icon 18" is displayed in the upper right part of a UI illustrated in FIG. 18. The user can brighten or darken the "fake sleep mode setting icon 18" by touching the "fake sleep mode setting icon 18".

When the "fake sleep mode setting icon 18" is brightened, a "fake sleep mode setting" is set to ON as illustrated in the upper right part of FIG. 18. In this ON setting, the fake sleep mode is enabled for the preset "fake sleep mode applicable app".

That is, the following mode transition is executed in this ON setting state (=a fake sleep mode enabled state).

While the power button is short pressed while the "fake sleep mode applicable app" is being executed in the "normal operation mode", the smartphone transitions from the "normal operation mode" to the "fake sleep mode". Note that, in this ON setting state (=the fake sleep mode enabled state), the "fake sleep mode applicable app identifier icon 11" is displayed on the status bar during the execution of the "fake sleep mode applicable app" in the "normal operation mode".

On the other hand, when the "fake sleep mode setting icon 18" is darkened, the "fake sleep mode setting" is set to OFF as illustrated in the lower right part of FIG. 18.

In this OFF setting, the fake sleep mode is disabled for the preset "fake sleep mode applicable app".

That is, the following mode transition is executed in this OFF setting state (=a fake sleep mode disabled state).

When the power button is short pressed while the "fake sleep mode applicable app" is being executed in the "normal operation mode", the smartphone transitions from the "normal operation mode" to the "sleep mode". That is, there is no transition to the "fake sleep mode".

Note that, in this OFF setting state (=the fake sleep mode disabled state), the "fake sleep mode applicable app identifier icon 11" is not displayed on the status bar during the execution of the "fake sleep mode applicable app" in the "normal operation mode".

In this manner, it is also possible to perform the processing of enabling or disabling the fake sleep mode with respect to the "fake sleep mode applicable app" by the user operation on the "fake sleep mode setting icon 18" in the UI illustrated in FIG. 18.

4. Sequence of Processing Executed by Information Processing Device of Present Disclosure Next, a sequence of processing executed by the information processing device of the present disclosure will be described.

Figure 19:
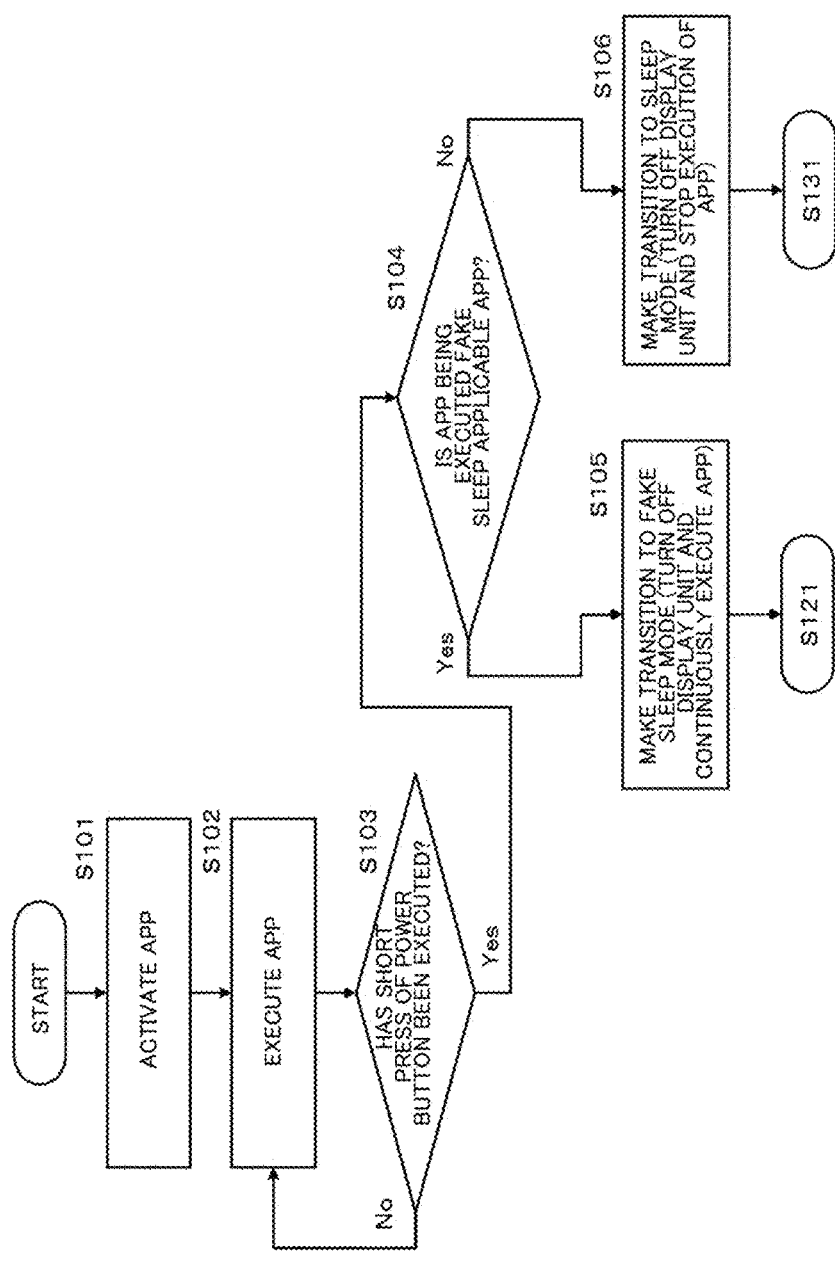
FIG. 19 is a diagram illustrating a flowchart for describing a processing sequence executed by the information processing device (smartphone) of the present disclosure.

Flowcharts illustrated in FIG. 19 and the subsequent figures are flowcharts for describing the sequence of processing executed by a smartphone that is the information processing device of the present disclosure.

Note that the processing according to flows illustrated in FIG. 19 and the subsequent figures can be executed in a data processing unit of the smartphone that is the information processing device of the present disclosure according to a program stored in a storage unit of the smartphone. The data processing unit includes, for example, a processor such as a CPU having a program execution function, and can perform the processing according to the flows through program execution processing using the processor.

Processing of each step illustrated in the flowcharts of FIG. 19 and the subsequent figures will be described.

(Step S101)

First, in step S101, a user activates an app such as a game app on the smartphone.

(Step S102)

Next, the app, such as a game app, activated by the user is executed in step S102. For example, a game is started.

Note that, at this time point, the smartphone is set to a "normal movable mode", and an execution screen of the app, for example, a game execution screen is displayed on a display unit of the smartphone.

(Step S103)

Next, in step S103, a control unit of the smartphone detects whether or not a short press of a power button has been executed during the execution of the app in the smartphone.

In a case where the short press of the power button is not detected, the app execution state in step S102 is continued.

In a case where the short press of the power button is detected, the processing proceeds to step S104.

(Step S104)

In the case where the short press of the power button is detected in step S103, in step S104, the control unit of the smartphone determines whether or not the app currently being executed on the smartphone is a "fake sleep mode applicable app".

In a case where the app being executed on the smartphone is the "fake sleep mode applicable app", the processing proceeds to step S105.

On the other hand, in a case where the app being executed on the smartphone is not the "fake sleep mode applicable app", the processing proceeds to step S106.

(Step S105)

In a case where the app being executed on the smartphone is the "fake sleep mode applicable app" in step S104, processing of step S105 is executed.

In this case, in step S105, the control unit of the smartphone causes the smartphone to transition from a "normal operation mode" to a "fake sleep mode".

In the "fake sleep mode", the display of the display unit of the smartphone is stopped (turned off). However, the app being executed is continuously executed. For example, in the case of a game app, a game progresses.

(Step S106)

On the other hand, in a case where the app being executed on the smartphone is not the "fake sleep mode applicable app" in step S104, processing of step S106 is executed.

In this case, in step S106, the control unit of the smartphone causes the smartphone to transition from the "normal operation mode" to a "sleep mode".

In the "sleep mode", the display of the display unit of the smartphone is stopped (turned off), and the app being executed is also stopped.

Next, processing in and after step S105, that is, processing after the app being executed on the smartphone is determined to be the "fake sleep mode applicable app" and the smartphone transitions to the "fake sleep mode" will be described with reference to a flowchart illustrated in FIG. 20.

(Step S121)

After the app being executed on the smartphone is determined to be the "fake sleep mode applicable app" and the smartphone transitions to the "fake sleep mode", the control unit of the smartphone determines in step S121 whether or not the duration of the "fake sleep mode" has exceeded a predefined threshold time.

In a case where the duration of the "fake sleep mode" does not exceed the predefined threshold time, the processing proceeds to step S122.

On the other hand, in a case where it is determined that the duration of the "fake sleep mode" exceeds the predefined threshold time, the processing proceeds to step S124.

(Step S122)

In a case where the duration of the "fake sleep mode" does not exceed the predefined threshold time in step S121, the processing proceeds to step S122.

In this case, in step S122, the control unit of the smartphone detects whether or not a short press of the power button has been executed.

In a case where the short press of the power button is not detected, the processing returns to step S121.

When the short press of the power button is detected, the processing proceeds to step S123.

(Step S123)

In a case where the short press of the power button is detected in step S122 during a period in which the smartphone is set to the "fake sleep mode", the processing proceeds to step S123.

In this case, in step S123, the control unit of the smartphone causes the smartphone to transition from the "fake sleep mode" to the "normal operation mode".

With this processing, the display unit of the smartphone is switched from a turn-off state to a display state, and the screen of the app that has been continuously executed during the "fake sleep mode" is displayed on the display unit.

After the smartphone transitions from the "fake sleep mode" to the "normal operation mode", the processing in and after step S102 illustrated in the flow of FIG. 19 is repeated and executed again.

(Step S124)

On the other hand, in a case where it is determined in step S121 that the duration of the "fake sleep mode" exceeds the predefined threshold time, the processing proceeds to step S124.

In this case, in step S124, the control unit of the smartphone causes the smartphone to transition from the "fake sleep mode" to the "sleep mode".

Note that the processing is executed according to the sequence set in advance in the smartphone.

As settings in a case where the duration of the fake sleep mode exceeds the predefined threshold time, for example, there are two types of settings as follows.

(Setting 1) Setting for causing smartphone to transition from "fake sleep mode" to "sleep mode"

(Setting 2) Setting for causing smartphone to transition from "fake sleep mode" to "normal operation mode"

This flow illustrates an example of processing according to (Setting 1) described above.

In a case where the smartphone is set to (Setting 2) described above, the smartphone transitions from the "fake sleep mode" to the "normal operation mode" when the duration of the "fake sleep mode" exceeds the predefined threshold time.

This flow is an example of the processing according to (Setting 1) described above, and the smartphone transitions from the "fake sleep mode" to the "sleep mode" when the duration of the "fake sleep mode" exceeds the predefined threshold time.

Note that, when the smartphone transitions from the "fake sleep mode" to the "sleep mode", the app that has been continuously executed in the "fake sleep mode" is stopped. Further, lock processing of the smartphone is executed.

(Step S125)

After the smartphone transitions from the "fake sleep mode" to the "sleep mode", the control unit of the smartphone detects whether or not the short press of the power button has been executed in step S125.

In a case where the short press of the power button is not detected, the processing returns to step S124.

In a case where the short press of the power button is detected, the processing proceeds to step S126.

(Step S126)

When the short press of the power button is detected in step S125, the control unit of the smartphone displays a screen for unlocking on the display unit of the smartphone in step S126.

The screen for unlocking is, for example, a passcode input screen, a fingerprint authentication screen, or the like.

Thereafter, it is possible to return to step S101 illustrated in FIG. 19 as the user executes unlock processing.

Figure 21:
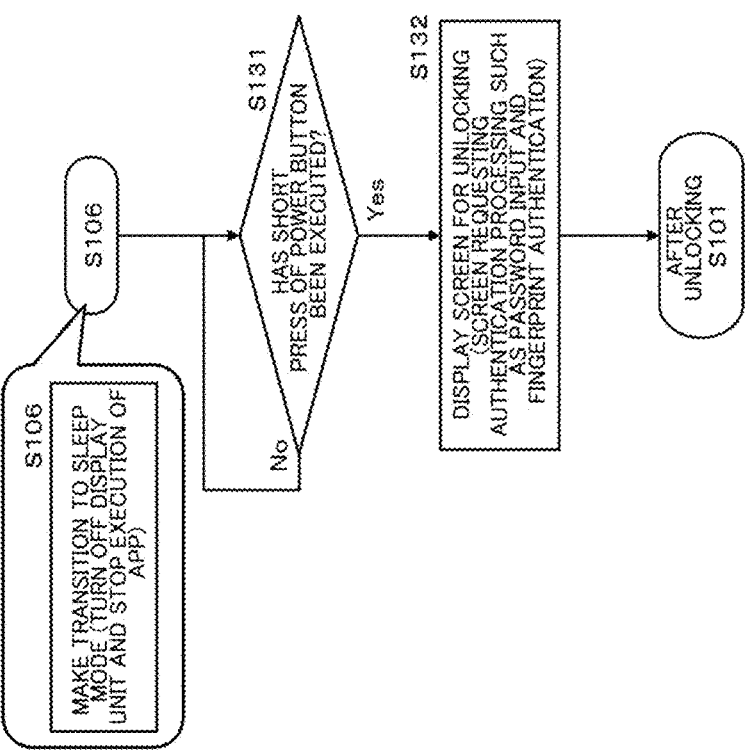
FIG. 21 is a diagram illustrating a flowchart for describing a processing sequence executed by the information processing device (smartphone) of the present disclosure.

Next, processing in and after step S106 of the flow illustrated in FIG. 19, that is, the processing after the app being executed in the "normal operation mode" of the smartphone is not determined to be the "fake sleep mode applicable app" and the smartphone transitions to the "sleep mode" in step S106 will be described with reference to a flowchart illustrated in FIG. 21.

(Step S131)

In a case where the app that has been executed by the smartphone in the "normal operation mode" is not the "fake sleep mode applicable app" and the smartphone has transitioned to the "sleep mode" in step S106 illustrated in FIG. 19, the control unit of the smartphone detects whether or not a short press of the power button has been executed in step S131.

In a case where the short press of the power button is not detected, the processing of step S131 is continued.

In a case where the short press of the power button is detected, the processing proceeds to step S132.

(Step S132)

When the short press of the power button is detected in step S131, the control unit of the smartphone displays a screen for unlocking on the display unit of the smartphone in step S132.

As described above, the screen for unlocking is, for example, a passcode input screen, a screen for fingerprint authentication, or the like.

Thereafter, it is possible to return to step S101 illustrated in FIG. 19 as the user executes unlock processing.

As described with reference to the flowcharts illustrated in FIGS. 19 to 21, when the app being executed in the "normal operation mode" of the smartphone is the "fake sleep mode applicable app", the smartphone (information processing device) of the present disclosure can transition to the "fake sleep mode" by the short press of the power button, stop the display of the display unit, and continuously execute the app.

Further, it is possible to return from the "fake sleep mode" to the "normal operation mode", display the execution screen of the app being continuously executed on the display unit, and resume the app from the screen after the execution by short pressing the power button again within the "fake sleep mode" period.

In addition, for returning from the "fake sleep mode" to the "normal operation mode", the unlock processing is not necessary, either, and the app such as a game can be resumed immediately after the mode transition.

Note that the mode transition processing from the "normal operation mode" to the "fake sleep mode" and the mode transition processing from the "fake sleep mode" to the "normal operation mode" are described as examples of the processing executed by the short press of the power button in the flows described with reference to FIGS. 19 to 21, but these steps of mode transition processing may be executed by a method other than the short press of the power button.

That is, mode transition processing based on detection information of various sensors, mode transition processing by touch processing of the display panel, and the like are also possible as illustrated in an example of the detailed settings on an app-by-app basis described above with reference to FIGS. 9 and 10.

Specifically, mode transition processing between the "normal operation mode" and the "fake sleep mode" may be executed based on position information of a GPS sensor, detection information of a proximity sensor, detection information of an illuminance sensor, touch processing on a display unit, or the like.

Figure 22:
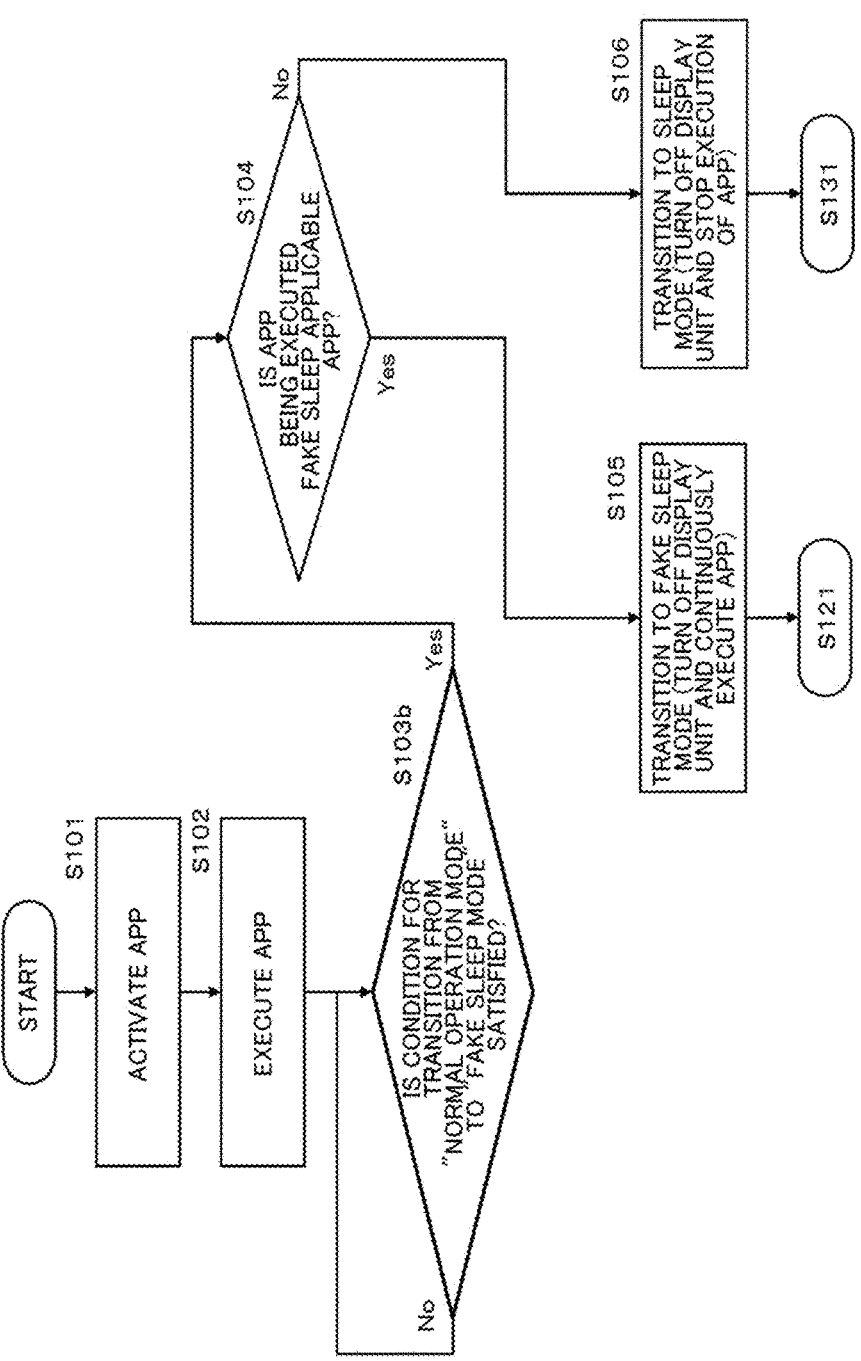
FIG. 22 is a diagram illustrating a flowchart for describing a processing sequence executed by the information processing device (smartphone) of the present disclosure.

A flow illustrated in FIG. 22 is a flowchart for describing a sequence of processing in a case where processing of determining the mode transition from the "normal operation mode" to the "fake sleep mode" is performed based on determination of various conditions in addition to the detection of the short press of the power button.

Steps S101 to S102 and steps S104 to S106 in the flowchart illustrated in FIG. 22 correspond to processing similar to the processing in steps S101 to S102 and steps S104 to S106 in the flowchart illustrated in FIG. 19 described above. In the flowchart illustrated in FIG. 22, step S103b is processing different from step S103 of the flowchart illustrated in FIG. 19 described above.

Processing of each step of the flow illustrated in FIG. 22 will be described.

(Step S101)

First, in step S101, the user activates an app such as a game app on the smartphone.

(Step S102)

Next, the app, such as a game app, activated by the user is executed in step S102. For example, a game is started.

Note that, at this time point, the smartphone is set to a "normal movable mode", and an execution screen of the app, for example, a game execution screen is displayed on a display unit of the smartphone.

(Step S103b)

Next, in step S103b, the control unit of the smartphone determines whether or not a condition for a transition from the "normal movable mode" to the "fake sleep mode" has occurred during the execution of the app in the smartphone.

FIG. 23 illustrates examples of the condition for the transition from the "normal movable mode" to the "fake sleep mode".

As illustrated in FIG. 23, examples of the condition for the transition from the "normal movable mode" to the "fake sleep mode" include the following conditions.

(1) Short press of power button (2) Proximity of display unit of smartphone to object (3) Decrease in illuminance in vicinity of display unit of smartphone (complete darkness)

(4) Detection of vehicle movement by smartphone

"(1) Short press of power button" is processing similar to the determination processing of step S103 described above with reference to the flow of FIG. 19.

"(2) Proximity of display unit of smartphone to object" refers to, for example, states of the smartphone being put in a pocket, being laid down on a table, and the like, and these states are detected by the proximity sensor of the smartphone.

"(3) Decrease in illuminance in vicinity of display unit of smartphone (complete darkness)" also refers to states of the smartphone being put in a pocket, being laid down on a table, and the like, and these states are detected by the illuminance sensor of the smartphone.

"(4) Detection of vehicle movement by smartphone" is processing for preventing a smartphone operation during driving, and is detected based on a GPS signal.

Note that these conditions for the transition from the "normal movable mode" to the "fake sleep mode" can be set on an app-by-app basis as described above with reference to FIG. 10.

In step S103b of the flow of FIG. 22, the control unit of the smartphone determines whether or not a mode transition condition corresponding to the app has occurred according to setting information corresponding to the app being executed in the "normal movable mode".

When the mode transition condition corresponding to the app has not occurred, the app execution of step S102 is continued.

When the occurrence of the mode transition condition corresponding to the app is detected, the processing proceeds to step S104.

(Step S104)

In a case where the occurrence of the mode transition condition corresponding to the app is detected in step S103b, the control unit of the smartphone determines in step S104 whether or not the app currently being executed on the smartphone is the fake sleep mode applicable app.

In a case where the app being executed on the smartphone is the "fake sleep mode applicable app", the processing proceeds to step S105.

On the other hand, in a case where the app being executed on the smartphone is not the "fake sleep mode applicable app", the processing proceeds to step S106.

(Step S105)

In a case where the app being executed on the smartphone is the "fake sleep mode applicable app" in step S104, processing of step S105 is executed.

In this case, in step S105, the control unit of the smartphone transitions the smartphone from the "normal operation mode" to the "fake sleep mode".

In the "fake sleep mode", the display of the display unit of the smartphone is stopped (turned off). However, the app being executed is continuously executed. For example, in the case of a game app, a game progresses.

(Step S106)

On the other hand, in a case where the app being executed on the smartphone is not the "fake sleep mode applicable app" in step S104, processing of step S106 is executed.

In this case, in step S106, the control unit of the smartphone causes the smartphone to transition from the "normal operation mode" to a "sleep mode".

In the "sleep mode", the display of the display unit of the smartphone is stopped (turned off), and the app being executed is also stopped.

As described with reference to the flow illustrated in FIG. 22, whether or not to perform the mode transition determination processing executed in step S103b, that is, the mode transition from the "normal movable mode" to the "fake sleep mode" can be determined based on various states.

The mode transition condition from the "normal movable mode" to the "fake sleep mode" can be variously set on an app-by-app basis using the detailed setting UI on an app-by-app basis described above with reference to FIG. 10.

Next, in a flow illustrated in FIG. 20 described above, in other words, processing after the smartphone transitions to the "fake sleep mode", a sequence of processing in a case where processing of determining a mode transition from the "fake sleep mode" to the "normal operation mode" is performed based on determination of various conditions in addition to detection of a short press of the power button will be described with reference to a flowchart illustrated in FIG. 24.

Figure 20:
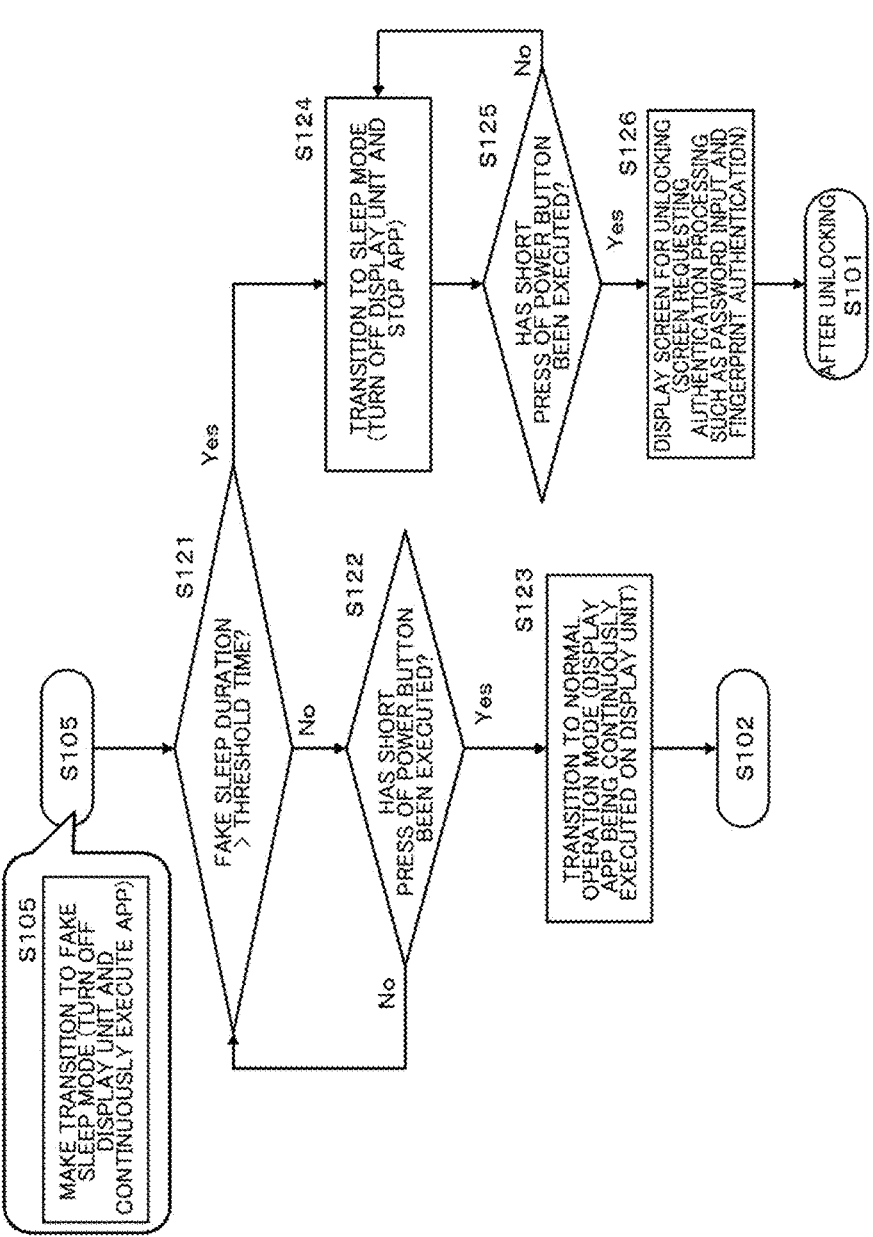
FIG. 20 is a diagram illustrating a flowchart for describing a processing sequence executed by the information processing device (smartphone) of the present disclosure.
Figure 24:
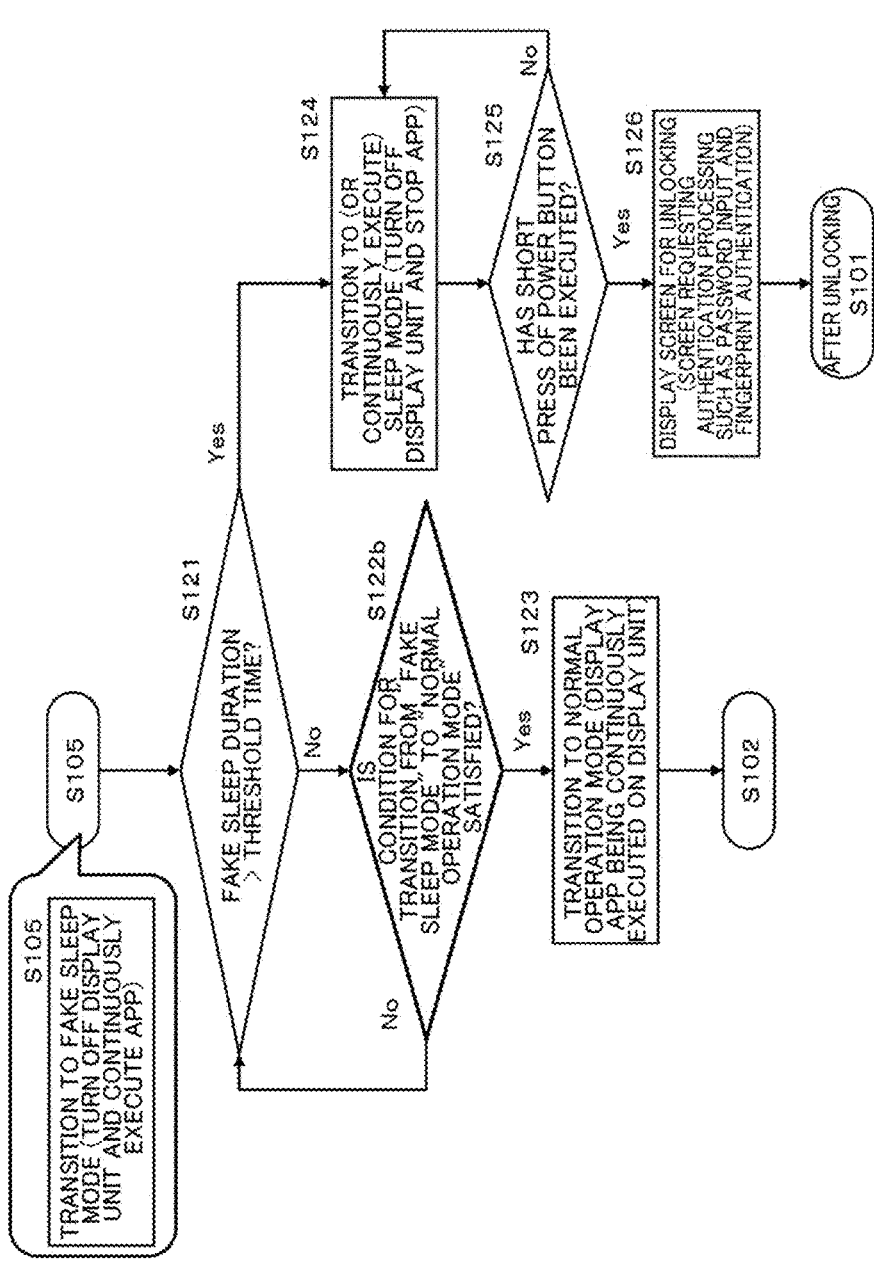
FIG. 24 is a diagram illustrating a flowchart for describing a processing sequence executed by the information processing device (smartphone) of the present disclosure.

Step S121 and steps S124 to S126 in the flowchart illustrated in FIG. 24 correspond processing similar to the processing in step S121 and steps S124 to S126 in the flowchart illustrated in FIG. 20 described above.

In the flowchart illustrated in FIG. 24, step S122b is processing different from step S122 of the flowchart illustrated in FIG. 20 described above.

Processing of each step of the flow illustrated in FIG. 24 will be described.

(Step S121)

After the app being executed on the smartphone is determined to be the "fake sleep mode applicable app" and the smartphone transitions to the "fake sleep mode", the control unit of the smartphone determines in step S121 whether or not the duration of the "fake sleep mode" has exceeded a predefined threshold time.

In a case where the duration of the "fake sleep mode" does not exceed the predefined threshold time, the processing proceeds to step S122b.

On the other hand, in a case where it is determined that the duration of the "fake sleep mode" exceeds the predefined threshold time, the processing proceeds to step S124.

(Step S122b)

In a case where the duration of the "fake sleep mode" does not exceed the predefined threshold time in step S121, the processing proceeds to step S122b.

In this case, in step S122b, the control unit of the smartphone determines whether or not a condition for a transition from the "fake sleep mode" to the "normal movable mode" has occurred.

FIG. 25 illustrates examples of the condition for the transition from the "fake sleep mode" to the "normal movable mode".

As illustrated in FIG. 25, examples of the condition for the transition from the "fake sleep mode" to the "normal movable mode" include the following conditions.

(1) Short press of power button
(2) Separation of display unit of smartphone from proximate object
(3) Increase in illuminance in vicinity of display unit of smartphone (complete darkness is solved)
(4) State where vehicle movement by smartphone is detected is solved
(5) Display unit is touched "(1) Short press of power button" is processing similar to the determination processing of step S122 described above with reference to the flow of FIG. 20.

"(2) Separation of display unit of smartphone from proximate object" refers to, for example, states such as a case where the smartphone is taken out of a pocket and a case where the smartphone being laid down on a table is lifted, and these states are detected by the proximity sensor of the smartphone.

"(3) Increase in illuminance in vicinity of display unit of smartphone (complete darkness is solved)" also refers to states such as a case where the smartphone is taken out of a pocket and a case where the smartphone being laid down on a table is lifted, and these states are detected by the illuminance sensor of the smartphone.

"(4) State where vehicle movement by smartphone is detected is solved" is processing for preventing a smartphone operation during driving, and is detected based on a GPS signal.

"(5) Display unit is touched" is a case where a touch (tap) processing by the user on the display unit in the turn-off state is detected. This is detected by a touch panel sensor on the display unit.

Note that these conditions for the transition from the "fake sleep mode" to the "normal operation mode" can be set on an app-by-app basis as described above with reference to FIG. 10.

In step S122b of the flow of FIG. 24, the control unit of the smartphone determines whether or not a mode transition condition corresponding to the app has occurred according to detailed settings corresponding to the app being executed in the "normal movable mode".

When the mode transition condition corresponding to the app has not occurred, the processing returns to step S121.

When the occurrence of the mode transition condition corresponding to the app is detected, the processing proceeds to step S123.

(Step S123)

In a case where the control unit of the smartphone determines that the condition for the transition from the "fake sleep mode" to the "normal movable mode" has occurred in step S122b while the smartphone is in the "fake sleep mode", the processing proceeds to step S123.

In this case, in step S123, the control unit of the smartphone causes the smartphone to transition from the "fake sleep mode" to the "normal operation mode".

With this processing, the display unit of the smartphone is switched from a turn-off state to a display state, and the screen of the app that has been continuously executed during the "fake sleep mode" is displayed on the display unit.

After the smartphone transitions from the "fake sleep mode" to the "normal operation mode", the processing in and after step S102 illustrated in the flow of FIG. 19 or FIG. 22 is repeated and executed again.
(Step S124)

On the other hand, in a case where it is determined in step S121 that the duration of the "fake sleep mode" exceeds the predefined threshold time, the processing proceeds to step S124.

In this case, in step S124, the control unit of the smartphone causes the smartphone to transition from the "fake sleep mode" to the "sleep mode".

Note that the processing is executed according to the sequence set in advance in the smartphone.

As settings in a case where the duration of the "fake sleep mode" exceeds the predefined threshold time, for example, there are two types of settings as follows.

(Setting 1) Setting for causing smartphone to transition from "fake sleep mode" to "sleep mode"

(Setting 2) Setting for causing smartphone to transition from "fake sleep mode" to "normal operation mode".

This flow illustrates an example of processing according to (Setting 1) described above.

In a case where the smartphone is set to (Setting 2) described above, the smartphone transitions from the "fake sleep mode" to the "normal operation mode" when the duration of the "fake sleep mode" exceeds the predefined threshold time.

This flow is an example of the processing according to (Setting 1) described above, and the smartphone transitions from the "fake sleep mode" to the "sleep mode" when the duration of the "fake sleep mode" exceeds the predefined threshold time.

Note that, when the smartphone transitions from the "fake sleep mode" to the "sleep mode", the app that has been continuously executed in the "fake sleep mode" is stopped. Further, lock processing of the smartphone is executed.
(Step S125)

After the smartphone transitions from the "fake sleep mode" to the "sleep mode", the control unit of the smartphone detects whether or not the short press of the power button has been executed in step S125.

In a case where the short press of the power button is not detected, the processing returns to step S124.

In a case where the short press of the power button is detected, the processing proceeds to step S126.
(Step S126)

In step S125, when the short press of the power button is detected, the control unit of the smartphone displays an unlock screen on the display unit of the smartphone in step S126.

The screen for unlocking is, for example, a passcode input screen, a fingerprint authentication screen, or the like.

Thereafter, it is possible to return to step S101 illustrated in FIG. 19 as the user executes unlock processing.

As described with reference to the flow illustrated in FIG. 24, whether or not to perform the mode transition determination processing executed in step S122b, that is, the mode transition from the "fake sleep mode" to the "normal movable mode" can be determined based on various states.

The mode transition condition from the "fake sleep mode" to the "normal movable mode" can be variously set on an app-by-app basis using the detailed setting UI on an app-by-app basis described above with reference to FIG. 10.

5. Configuration Example of Information Processing Device of Present Disclosure Next, a configuration example of the information processing device of the present disclosure will be described.

Figure 26:
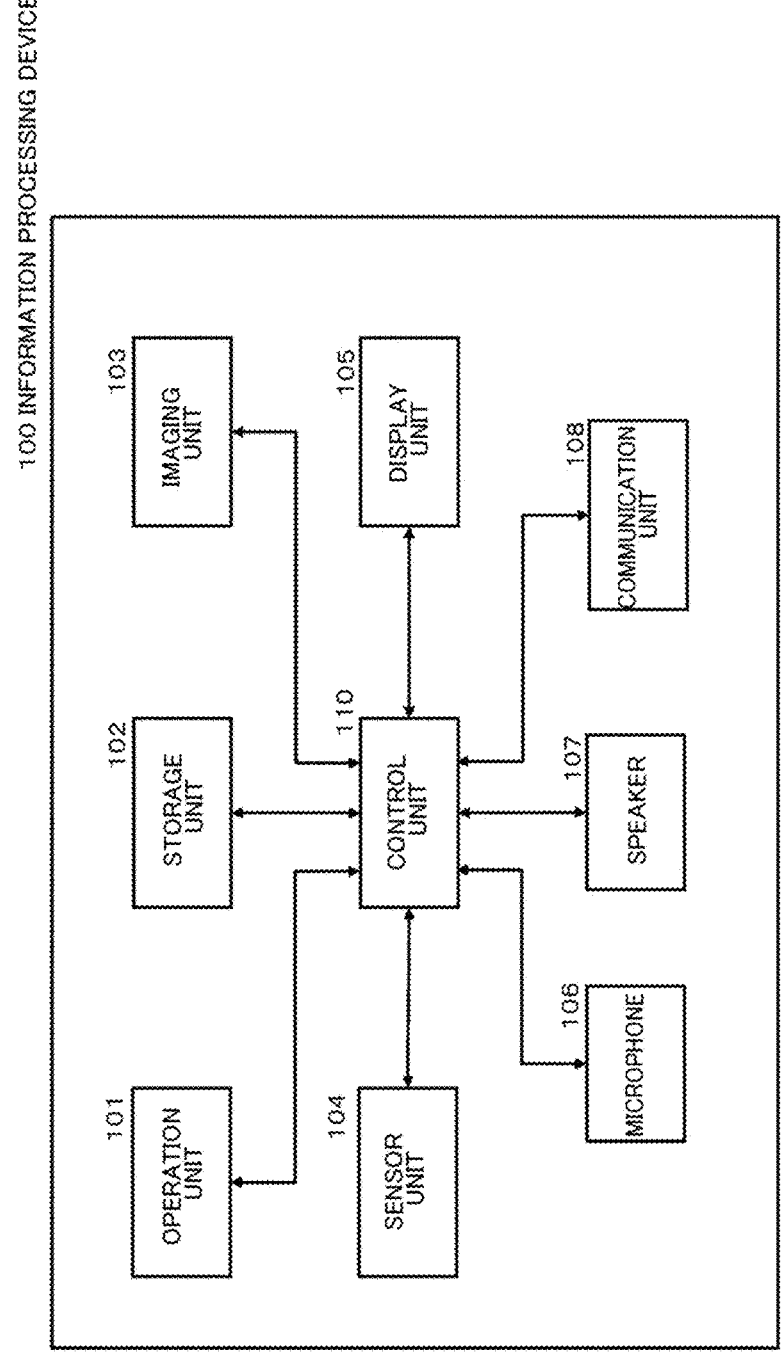
FIG. 26 is a diagram for describing a configuration example of the information processing device of the present disclosure.

FIG. 26 is a block diagram illustrating a functional configuration of the information processing device of the present disclosure, that is, the information processing device such as a smartphone.

As illustrated in FIG. 26, an information processing device 100 includes an operation unit 101, a storage unit 102, an imaging unit 103, a sensor unit 104, a display unit 105, a microphone 106, a speaker 107, a communication unit 108, and a control unit 110.

The operation unit 101 detects various user operations such as device operations for applications.

Examples of the device operations include an operation on a power button and touch processing on a display unit.

Touch operation information with respect to the operation unit 101, for example, the power button or the display unit is input to the control unit 110.

The storage unit 102 is a storage area for temporarily or permanently storing various programs and data.

For example, the storage unit 102 stores programs and data for the information processing device 100 to execute various functions. As a specific example, the storage unit 102 stores programs for executing various applications, management data for managing various settings, and the like.

In addition, the storage unit 102 also records information on whether each of apps is a "fake sleep mode applicable app" or a "fake sleep mode non-applicable app" described above, detailed setting information of a "fake sleep mode" on an app-by-app basis, and the like.

The imaging unit 103 captures an image of, for example, a face of a user who operates the information processing device 100 under the control of the control unit 110.

The sensor unit 104 includes a proximity sensor, an illuminance sensor, a GPS signal reception sensor, an acceleration sensor, a gyro sensor, a vibration sensor, and the like.

Detection information of the sensor unit 104 is input to the control unit 110.

The display unit 105 displays various types of information under the control by the control unit 110. The display unit 105 displays, for example, an application execution screen.

The display unit 105 may include various display devices such as a liquid crystal display (LCD) device and an organic light emitting diode (OLED) display device.

In addition, the display unit 105 controls display processing and stop processing (turn-off) of the application execution screen under the control of the control unit 110.

The microphone 106 includes a microphone or the like that collects audio uttered by the user, and the like under the control of the control unit 110.

The speaker 107 outputs various types of audio. For example, audio or sound according to status of an application is output under the control of the control unit 110.

The communication unit 108 functions as, for example, a transceiver for Wi-Fi communication, Bluetooth (registered trademark) (BT) communication, and other data communication via a network such as the Internet or a local area network, and communicates with an external device such as a server.

The control unit 110 controls, for example, display data to be output to the display unit 105 and transmission data to be transmitted via the communication unit 108.

In addition, the control unit 110 performs app control such as activation, execution, and stop of an execution app based on the user operations on the operation unit 101.

In addition, for example, processing of displaying various user interfaces (UIs) described above with reference to FIGS. 7 to 17 on the display unit 105 and processing of recording setting information corresponding to the user operations on the displayed UI in the storage unit 102 are executed.

The control unit 110 further executes data communication control via the communication unit 108.

Note that specific examples of processing executed by the control unit 110 of the information processing device 100 of the present disclosure include, for example, the following processing.

(a) Processing of determining whether an app being executed in a "normal operation mode" is a fake sleep mode applicable app or a fake sleep mode non-applicable app (b) Processing of transitioning to the "fake sleep mode" in response to occurrence of a defined mode transition condition, such as a short press of the power button, in a case where the app being executed in the "normal operation mode" is the "fake sleep mode applicable app", stopping display of an app execution screen of the display unit or executing a change to power-saving display of at least any one of reduction of a backlight output, reduction of a screen refresh rate, or screen partial display, and continuously executing the app.

(c) Processing of transitioning to a "sleep mode" in response to occurrence of a defined mode transition condition, such as the short press of the power button, in a case where the app being executed in the "normal operation mode" is the "fake sleep mode non-applicable app", stopping the display of the app execution screen on the display unit, and also stopping the execution of the app.

(d) Processing of transitioning from the "normal operation mode" or the "sleep mode" to the "fake sleep mode" when the duration of the "fake sleep mode" exceeds predefined duration.

(e) Processing of displaying, on the display unit, the user interfaces (UIs) described above with reference to FIGS. 7 to 10 for each of apps that can be executed by the information processing device, that is, the UI for setting whether to set the "fake sleep mode applicable app" or the "fake sleep mode non-applicable app" on an app-by-app basis, and the detailed setting UI for performing detailed settings of the "fake sleep mode" for the "fake sleep mode applicable app".

The control unit 110 executes these steps of processing, for example.

Although an example of the functional configuration of the information processing device 100 has been described so far, the functional configuration described above with reference to FIG. 26 is merely an example, and the functional configuration of information processing device 100 according to the present embodiment is not limited to this example.

For example, the information processing device 100 does not necessarily include all of the configurations illustrated in FIG. 26, and each of the configurations can also be provided in a device different from the information processing device 100. The functional configuration of the information processing device 100 according to the present embodiment can be flexibly modified according to specifications and operations.

In addition, the functions of the respective components may be implemented when an arithmetic unit such as a central processing unit (CPU) reads a control program from a storage medium such as a read only memory (ROM) or a random access memory (RAM) that stores the control program, which describes the processing procedure for implementing the functions and analyzes and executes the program.

Therefore, it is possible to appropriately change a configuration to be used according to a technical level at the time of carrying out the present embodiment.

6. Hardware Configuration Example of Information Processing Device of Present Disclosure Next, a hardware configuration example of the information processing device of the present disclosure will be described with reference to FIG. 27.

Figure 27:
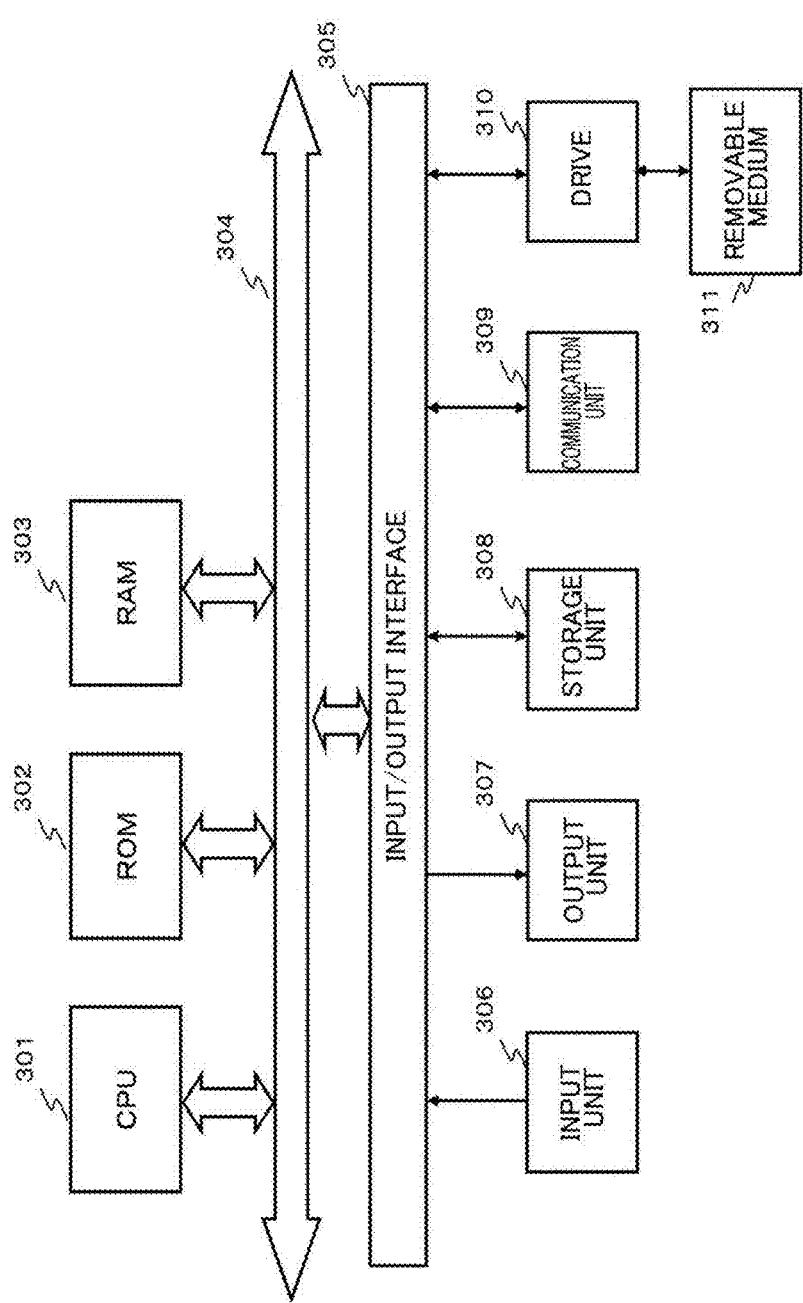
FIG. 27 is a diagram for describing a hardware configuration example of the information processing device of the present disclosure.

Note that hardware of the information processing device illustrated in FIG. 27 corresponds to hardware of the smartphone which is an example of the information processing device of the present disclosure.

Hereinafter, each constituent part constituting the hardware of the information processing device illustrated in FIG. 27 will be described.

A central processing unit (CPU) 301 functions as a control unit or a data processing unit that executes various types of processing according to a program stored in a read only memory (ROM) 302 or a storage unit 308. For example, the processing according to the sequence described in the above embodiment is executed. A random access memory (RAM) 303 stores the program executed by the CPU 301, data, and the like. The CPU 301, the ROM 302, and the RAM 303 are connected to each other by a bus 304.

The CPU 301 is connected to an input/output interface 305 via the bus 304, and the input unit 306 including various switches, a button, a touch panel, a microphone, and the like, and an output unit 307 that executes data output to a display unit, a speaker, and the like are connected to the input/output interface 305. The CPU 301 executes various types of processing in response to a command input from the input unit 306 and outputs processing results to the output unit 307, for example.

The storage unit 308 connected to the input/output interface 305 stores the programs executed by the CPU 301 and various types of data. A communication unit 309 functions as a transceiver for Wi-Fi communication, Bluetooth (registered trademark) (BT) communication, and other data communication via networks such as the Internet or a local area network, and communicates with external devices.

A drive 310 connected to the input/output interface 305 drives a removable medium 311 such as a semiconductor memory such as a memory card, and records or reads data.

7. Summary of Configuration of Present Disclosure

Embodiments of the present disclosure have been described in detail above with reference to specific embodiments. However, it is obvious that those skilled in the art can modify or replace the embodiments without departing from the gist of this disclosure. That is, the present invention has been disclosed in the form of examples and should not be construed in a limiting manner. In order to determine the gist of the present disclosure, the claims should be considered.

Note that the technology disclosed in the present specification can have the following configurations.

(1) An information processing device including a control unit that executes app execution control and display control of a display unit, the control unit determining whether an app being executed in a normal operation mode is a fake sleep mode applicable app or a fake sleep mode non-applicable app, executing mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and executing mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.

(2) The information processing device according to (1), wherein the defined mode transition condition is a short press of a power button, and the control unit executes the mode transition processing to the fake sleep mode in which the display of the app execution screen of the display unit is stopped or changed to the power-saving display and the app is continuously executed, in response to the short press of the power button in the case where the app being executed in the normal operation mode is the fake sleep mode applicable app, and executes the mode transition processing to the sleep mode in which the display of the app execution screen on the display unit is stopped and the execution of the app is also stopped, in response to the short press of the power button in the case where the app being executed in the normal operation mode is the fake sleep mode non-applicable app.

(3) The information processing device according to (1) or (2), wherein the power-saving display is display processing of at least any one of reduction of a backlight output, reduction of a screen refresh rate, or screen partial display, and the control unit stops the display of the app execution screen of the display unit or executes the change to the power-saving display of at least any one of the reduction of the backlight output, the reduction of the screen refresh rate, or the screen partial display, in response to the occurrence of the defined mode transition condition in the case where the app being executed in the normal operation mode is the fake sleep mode applicable app.

(4) The information processing device according to any one of (1) to (3), wherein the control unit executes mode transition processing from the fake sleep mode to the normal operation mode in a case where duration of the fake sleep mode exceeds predefined duration.

(5) The information processing device according to any one of (1) to (4), wherein the control unit executes mode transition processing from the fake sleep mode to the sleep mode in a case where duration of the fake sleep mode exceeds predefined duration.

(6) The information processing device according to any one of (1) to (5), wherein the control unit executes lock processing in the sleep mode and requests unlock processing for a mode transition from the sleep mode to the normal operation mode, and does not execute the lock processing in the fake sleep mode and performs control in which the unlock processing is not required for a mode transition from the fake sleep mode to the normal operation mode.

(7) The information processing device according to any one of (1) to (6), wherein the control unit in a case where the app being executed in the normal operation mode is the fake sleep mode applicable app, executes the mode transition processing to the fake sleep mode in accordance with a sensor detection value of at least any one of a detection value of a touch sensor or a detection value of an illuminance sensor.

(8) The information processing device according to (7), wherein the control unit executes the mode transition processing to the fake sleep mode in a case where the sensor detection value of at least any one of the detection value of the touch sensor or the detection value of the illuminance sensor indicates that the display unit of the information processing device is in a state of being in proximity to another object.

(9) The information processing device according to any one of (1) to (8), wherein the control unit in a case where the app being executed in the normal operation mode is the fake sleep mode applicable app, executes the mode transition processing to the fake sleep mode in accordance with an analysis value of a GPS signal.

(10) The information processing device according to (9), wherein the control unit executes the mode transition processing to the fake sleep mode in a case where the analysis value of the GPS signal indicates that the information processing device is in a moving state in a vehicle.

(11) The information processing device according to any one of (1) to (10), wherein the control unit changes a display area of the app execution screen on the display unit from full screen display to partial area display in the fake sleep mode.

(12) The information processing device according to any one of (1) to (11), wherein the control unit causes the display of the app execution screen on the display unit to be stopped and changed to display of wallpaper including predefined data in the fake sleep mode.

(13) The information processing device according to any one of (1) to (12), wherein the control unit displays, on the display unit, a user interface for setting each of apps executable in the information processing device to either the fake sleep mode applicable app or the fake sleep mode non-applicable app on an app-by-app basis.

(14) The information processing device according to any one of (1) to (13), wherein the control unit displays, on the display unit, a detailed setting user interface to perform a detailed setting of the fake sleep mode for the fake sleep mode applicable app.

(15) The information processing device according to (14), wherein the detailed setting user interface is configured to be capable of setting at least any one of (a) to (f) below:

(a) a time until a transition from the fake sleep mode to the normal operation mode;

(b) a time until automatic locking;

(c) sensor information to be used for a transition to the fake sleep mode;

(d) a backlight output;

(e) touch sensing; and (f) a screen refresh rate.

(16) The information processing device according to any one of (1) to (15), the information processing device being a smart phone.

(17) An information processing method executed in an information processing device, the information processing device including a control unit that executes app execution control and display control of a display unit, the control unit determining whether an app being executed in a normal operation mode is a fake sleep mode applicable app or a fake sleep mode non-applicable app, executing mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and executing mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.

(18) A program for causing an information processing device to execute information processing, the information processing device including a control unit that executes app execution control and display control of a display unit, the program causing the control unit to determine whether an app being executed in a normal operation mode is a fake sleep mode applicable app or a fake sleep mode non-applicable app, execute mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and execute mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non-applicable app.

The series of processing described in this specification can be executed by hardware, software, or a composite configuration of both. If the series of processing is to be executed by software, the series of processing can be executed by installing a program recording the processing sequence into a memory in a computer embedded in dedicated hardware, or by installing the program into a general-purpose computer capable of executing various kinds of processing. For example, the program can be pre-recorded on a recording medium. Rather than being installed into a computer from a recording medium, the program can be received via a network such as a local area network (LAN) or the Internet, and installed into a built-in recording medium such as a hard disk.

Note that various types of processing described in the specification are not necessarily executed in chronological order according to the description, but may also be executed in parallel or individually according to processing capability of a device that executes the processing or as necessary. In addition, in the present specification, the system is a logical collective configuration of a plurality of devices, and the devices of the respective configurations are not limited to being in the same housing.

INDUSTRIAL APPLICABILITY

As described above, according to a configuration of one embodiment of the present disclosure, in an information processing device such as a smartphone, a configuration that enables an app to be continuously executed even while display of a display unit is stopped is achieved.

Specifically, for example, a control unit that executes app execution control and display control of the display unit is provided. The control unit determines whether an app being executed in a normal operation mode is a fake sleep mode applicable app or a fake sleep mode non-applicable app, executes mode transition processing to a fake sleep mode in which display of an app execution screen of the display unit is stopped or changed to power-saving display and the app is continuously executed, in response to occurrence of a defined mode transition condition in a case where the app being executed in the normal operation mode is the fake sleep mode applicable app, and executes mode transition processing to a sleep mode in which the display of the app execution screen on the display unit is stopped and the execution of the app is also stopped, in response to occurrence of a defined mode transition condition in a case where the app being executed in the normal operation mode is the fake sleep mode non applicable app.

These steps of processing achieve the configuration in which the app can be continuously executed even while the display of the display unit is stopped in the information processing device such as a smartphone.

REFERENCE SIGNS LIST

10 Smartphone (information processing device)
11 Fake sleep mode applicable app identifier icon
12 Power button
18 Fake sleep mode setting icon
50 Display unit
51 Display panel
52 Display unit driver
53 Memory
70 Control unit
71 CPU
72 GPU 73 Drawing processing unit
80 Display unit IF (MIPI)
100 Information processing device
101 Operation unit
102 Storage unit
103 Imaging unit
104 Sensor unit
105 Display unit
106 Microphone
107 Speaker
108 Communication unit
110 Control unit
301 CPU
302 ROM
303 RAM
304 Bus
305 Input/output interface
306 Input unit
307 Output unit
308 Storage unit
309 Communication unit
310 Drive
311 Removable medium

The invention claimed is:

1. A mobile information processing device comprising:
circuitry configured to
for an app running in a normal operation mode in which an app execution screen is displayed on a display, determine whether the app running in the normal operation mode is a fake sleep mode applicable app or a fake sleep mode non-applicable app,
execute mode transition processing to transition from the normal operation mode to a fake sleep mode in which the display of the app execution screen of the display is stopped or changed to power-saving display and whereby the app is continuously executed for the mode transition processing to the fake sleep mode and in the fake sleep mode, in response to occurrence of a defined mode transition condition in a first case where the app being executed in the normal operation mode is determined to be the fake sleep mode applicable app, and
execute mode transition processing to transition from the normal operation mode to a sleep mode in which the display of the app execution screen on the display is stopped and execution of the app is also stopped, in response to occurrence of a defined mode transition condition in a second case where the app being executed in the normal operation mode is determined to be the fake sleep mode non-applicable app.

2. The mobile information processing device according to claim 1, wherein
the defined mode transition condition is a short press of a power button, and
the circuitry
executes the mode transition processing to transition from the normal operation mode to the fake sleep mode in response to the short press of the power button in the first case where the app being executed in the normal operation mode is determined to be the fake sleep mode applicable app, and
executes the mode transition processing to transition from the normal operation mode to the sleep mode in response to the short press of the power button in the second case where the app being executed in the normal operation mode is determined to be the fake sleep mode non-applicable app.

3. The mobile information processing device according to claim 1, wherein
the power-saving display is display processing of at least any one of reduction of a backlight output, reduction of a screen refresh rate, and/or screen partial display, and
the circuitry
stops the display of the app execution screen of the display or executes the change to the power-saving display of at least any one of the reduction of the backlight output, the reduction of the screen refresh rate, and/or the screen partial display, in response to the occurrence of the defined mode transition condition in the first case where the app being executed in the normal operation mode is determined to be the fake sleep mode applicable app.

4. The mobile information processing device according to claim 1, wherein the circuitry
executes mode transition processing from the fake sleep mode to the normal operation mode in a case where duration of the fake sleep mode exceeds a predefined duration.

5. The mobile information processing device according to claim 1, wherein the circuitry
executes mode transition processing from the fake sleep mode to the sleep mode in a case where duration of the fake sleep mode exceeds a predefined duration.

6. The mobile information processing device according to claim 1, wherein the circuitry
executes lock processing in the sleep mode and requests unlock processing for a mode transition from the sleep mode to the normal operation mode, and
does not execute the lock processing in the fake sleep mode and performs control in which the unlock processing is not required for a mode transition from the fake sleep mode to the normal operation mode.

7. The mobile information processing device according to claim 1, wherein the circuitry,
in a case where the app being executed in the normal operation mode is determined to be the fake sleep mode applicable app,
executes the mode transition processing from the normal operation mode to the fake sleep mode in accordance with a sensor detection value of at least any one of a detection value of a touch sensor and/or a detection value of an illuminance sensor.

8. The mobile information processing device according to claim 7, wherein the circuitry
executes the mode transition processing from the normal operation mode to the fake sleep mode in a case where the sensor detection value of at least any one of the detection value of the touch sensor and/or the detection value of the illuminance sensor indicates that the display of the information processing device is in a state of being determined to be within a predetermined distance away from another object.

9. The mobile information processing device according to claim 1, wherein the circuitry,
in the first case where the app being executed in the normal operation mode is determined to be the fake sleep mode applicable app,
executes the mode transition processing from the normal operation mode to the fake sleep mode in accordance with an analysis value of a GPS signal.

10. The mobile information processing device according to claim 9, wherein the circuitry
executes the mode transition processing from the normal operation mode to the fake sleep mode in a case where the analysis value of the GPS signal indicates that the information processing device is in a moving state in a vehicle.

11. The mobile information processing device according to claim 1, wherein the circuitry changes a display area of the app execution screen on the display from full screen display to partial area display in the fake sleep mode.

12. The mobile information processing device according to claim 1, wherein the circuitry causes display of the app execution screen on the display to be stopped and changed to display of wallpaper including predefined data in the fake sleep mode.

13. The mobile information processing device according to claim 1, wherein the circuitry displays, on the display, a user interface for setting each of a plurality of apps executable in the information processing device, including said app, to either the fake sleep mode applicable app or the fake sleep mode non-applicable app on an app-by-app basis.

14. The mobile information processing device according to claim 1, wherein the circuitry displays, on the display, a detailed setting user interface to perform a detailed setting of the fake sleep mode for the fake sleep mode applicable app.

15. The mobile information processing device according to claim 14, wherein the detailed setting user interface is configured to set at least any one of (a) to (f) below:

(a) a time until a transition from the fake sleep mode to the normal operation mode;

(b) a time until automatic locking;

(c) sensor information to be used for a transition to the fake sleep mode;

(d) a backlight output;

(e) touch sensing; and/or (f) a screen refresh rate.

16. The mobile information processing device according to claim 1, wherein the mobile information processing device is a smart phone.

17. The mobile information processing device according to claim 1, wherein the app is a game app and not either a message reception app or a position detection app.

18. The mobile information processing device according to claim 1, wherein the fake sleep mode has a higher battery power consumption threshold compared to the sleep mode.

19. An information processing method executed in a mobile information processing device, the information processing device including a controller that executes app execution control and display control of a display, the information processing method comprising:

for an app running in a normal operation mode in which an app execution screen is displayed on a display determining whether the app being executed in the normal operation mode is a fake sleep mode applicable app or a fake sleep mode non-applicable app, executing mode transition processing to transition from the normal operation mode to a fake sleep mode in which the display of an app execution screen of the display is stopped or changed to power-saving display and whereby the app is continuously executed for the mode transition processing to the fake sleep mode and in the fake sleep mode, in response to occurrence of a defined mode transition condition in a first case where the app being executed in the normal operation mode is determined to be the fake sleep mode applicable app, and executing mode transition processing to transition from the normal operation mode to a sleep mode in which the display of the app execution screen on the display is stopped and execution of the app is also stopped, in response to occurrence of a defined mode transition condition in a second case where the app being executed in the normal operation mode is determined to be the fake sleep mode non-applicable app.

20. A non-transitory computer-readable storage medium having stored thereon instructions that, when executed by one or more processors, causes the one or more processors to perform a method comprising:

for an app running in a normal operation mode in which an app execution screen is displayed on a display, determining whether the app being executed in the normal operation mode is a fake sleep mode applicable app or a fake sleep mode non-applicable app, executing mode transition processing to transition from the normal operation mode to a fake sleep mode in which the display of an app execution screen of the display is stopped or changed to power-saving display and whereby the app is continuously executed for the mode transition processing to the fake sleep mode and in the fake sleep mode, in response to occurrence of a defined mode transition condition in a first case where the app being executed in the normal operation mode is determined to be the fake sleep mode applicable app, and executing mode transition processing to transition from the normal operation mode to a sleep mode in which the display of the app execution screen on the display is stopped and execution of the app is also stopped, in response to occurrence of a defined mode transition condition in a second case where the app being executed in the normal operation mode is determined to be the fake sleep mode non-applicable app.

* * * * *